United States Patent [19]

Palmer

[11] Patent Number: 5,580,405

[45] Date of Patent: Dec. 3, 1996

[54] EXTRUSION OF LAMINATE PIPES

[75] Inventor: Raymond J. Palmer, Haslington, Great Britain

[73] Assignee: Avondale Property (Holdings) Limited, Warwickshire, Great Britain

[21] Appl. No.: 305,442

[22] Filed: Sep. 13, 1994

[30] Foreign Application Priority Data

Sep. 20, 1993 [GB] United Kingdom ................... 9319408

[51] Int. Cl.⁶ ........................... B29C 47/02; B29C 47/26
[52] U.S. Cl. ...................... 156/73.1; 156/187; 156/203; 156/244.14; 156/244.17; 156/466; 228/1.1; 264/469; 264/83; 264/171.14; 264/171.27; 425/113; 425/133.1
[58] Field of Search .......................... 264/83, 173, 340, 264/469, 171.27; 425/133.1, 113; 156/203, 244.12–244.14, 187, 466, 244.17, 73.1; 228/1.1

[56] References Cited

U.S. PATENT DOCUMENTS

| | | | |
|---|---|---|---|
| 3,376,181 | 4/1968 | Larson et al. . | |
| 3,692,447 | 9/1972 | Nelson | 425/113 |
| 3,959,567 | 5/1976 | Bradley | 264/83 |

(List continued on next page.)

FOREIGN PATENT DOCUMENTS

| | | | |
|---|---|---|---|
| 0237234 | 9/1987 | European Pat. Off. . | |
| 0267441 | 5/1988 | European Pat. Off. | 264/83 |
| 0353977 | 2/1990 | European Pat. Off. . | |

(List continued on next page.)

OTHER PUBLICATIONS

Japanese Patent Abstract; vol. 7 no. 159 (p–289), Jul. 24, 1984 & JP–A–59 057109 2 Apr. 1984.
Japanese Patent Abstract; vol. 13 No. 52 (M–794), Feb. 7, 1989 & JP–A–63 256419; Oct. 24, 1988.
Japanese Patent Abstract; vol. 10 No. 342 (M–536) [2398], Nov. 19, 1986 & JP–A–61 144322, Jul. 2, 1986.

*Primary Examiner*—Jeffery R. Thurlow
*Attorney, Agent, or Firm*—Longacre & White

[57] ABSTRACT

An extrusion assembly for extrusion of a triple walled (plastic/metal/plastic) pipe includes a first extrusion apparatus, for extruding an inner plastics layer of the pipe, having an extruder with a coaxial outer extrusion sleeve and inner extrusion die, a shaping sleeve surrounding and substantially coaxial with the extruder, which shaping sleeve is capable of shaping a U-section form metallic layer passing through it into a tubular configuration and a welder for welding the metallic layer of tubular configuration to provide a metal tube, a conduit for supplying a pressurized gas internally of the pipe whereby extruded plastics material emerging from the first extrusion apparatus is forced against an internal surface of the metal tube, and a second extrusion apparatus, for extruding an outer plastics layer of the pipe, having a body part and a supply channel within the body part for supplying plastics material, which extrusion assembly has at least one of, (a) an essentially annular section recess in the body part of the second extrusion apparatus capable of receiving an end of the shaping sleeve, thus allowing accurate positioning of the shaping sleeve relative to the first and second extrusion apparatuses, and (b) a universal joint to which the extruder of the first extrusion apparatus is operatively connected, which connection is adjustable to allow accurate positioning of the exit orifice of the first extrusion apparatus relative to the exit orifice of the second extrusion apparatus.

20 Claims, 6 Drawing Sheets

5,580,405
Page 2

U.S. PATENT DOCUMENTS

| | | | |
|---|---|---|---|
| 4,204,496 | 5/1980 | Ikegami et al. | 425/113 |
| 4,370,186 | 1/1983 | Blandin et al. | |
| 4,422,991 | 12/1983 | Phillips | 264/83 |
| 4,707,384 | 11/1987 | Schachner et al. | |
| 4,724,027 | 2/1988 | Piltz et al. | 156/244.12 |
| 4,743,419 | 5/1988 | Bierschenk | 264/340 |
| 4,816,099 | 3/1989 | Yamabe | 156/244.13 |
| 4,904,323 | 2/1990 | Nadeau | 156/244.13 |
| 4,911,778 | 3/1990 | Barnoach | 156/244.13 |
| 5,152,323 | 10/1992 | Shotts et al. | 138/151 |
| 5,409,559 | 4/1995 | Lajovic | 156/244.14 |

FOREIGN PATENT DOCUMENTS

| | | | |
|---|---|---|---|
| 0502303 | 8/1992 | European Pat. Off. | |
| 0581208 | 2/1994 | European Pat. Off. | |
| 2311192 | 9/1974 | Germany | 264/173 |
| 3522583 | 2/1986 | Germany | |
| 2111164 | 6/1983 | United Kingdom | 425/113 |
| 2223427 | 4/1990 | United Kingdom | |
| 8803084 | 5/1988 | WIPO | |

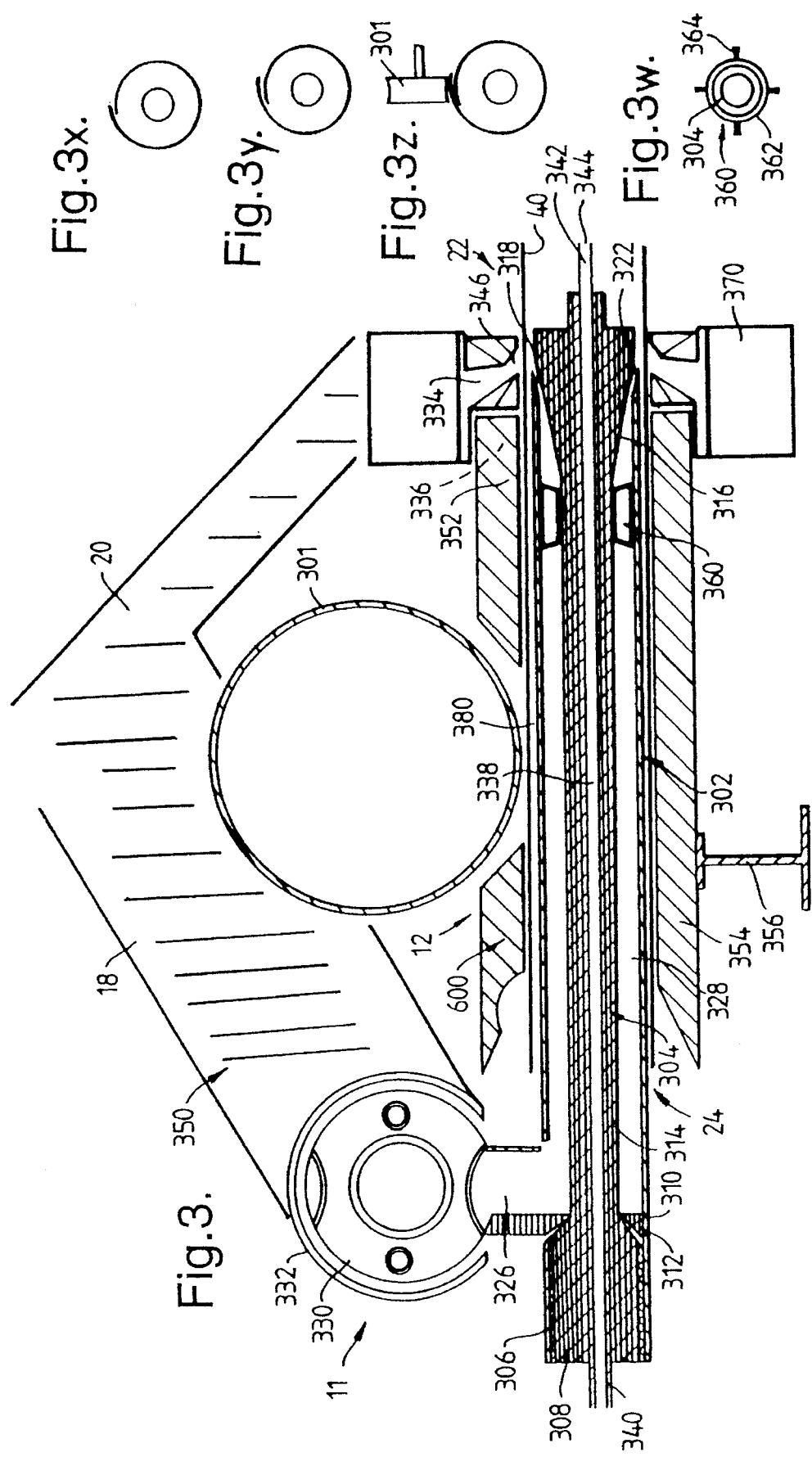

EXTRUSION OF LAMINATE PIPES

BACKGROUND OF THE INVENTION

This invention relates to a method and apparatus for the formation by extrusion of a laminate pipe having respective layers of metallic and plastics materials, especially a triple walled pipe having inner and outer layers of plastics material and incorporating between them a metallic layer. Such multilayered pipes are in themselves well known, as are methods and apparatus for their production by extrusion. Typical examples are given in EP-A-0024220, EP-A-0237234, U.S. Pat. No. 3,376,181, WO-A-88/03084, FR-A-2434326, FR-A-1508630, GB-A-2223427 and U.S. Pat. No. 4,370,186.

However, in these prior art constructions, the plastics material is adhered to the metallic layer either by incorporation of an interlayer of an adhesive between each of the layers of plastics material and the metal foil (see, for example, GB-A-2223427) and/or pretreating the metal foil with a strong acid or alkali (see, for example EP-A-0237234) to provide an etched metallic substrate.

Such constructions are said to be advantageous during the final working up stages during production of the multilayered pipe, which is capable of preventing diffusion of oxygen radially through it.

Typical of the prior art is the extrusion assembly disclosed in U.S. Pat. No. 4,370,186. In this apparatus, a U-section form metallic strip is led around a first extrusion apparatus for extruding respective inner layers of adhesive and plastics material and formed, by means of a shaping device, into a metal tube surrounding a nozzle of the first extrusion apparatus, the tube being welded upstream of the end of the nozzle running through the tube. Respective concentric layers of molten plastics material forming an innermost plastics layer and an adhesive layer respectively are extruded through an annular section gap between an outer wall of the tubular nozzle and a centrally located die and out of the nozzle through an exit orifice. As the sealed tube passes the exit orifice it is coated by the adhesive and plastics layers to provide respective inner layers. The die has a centrally disposed passage through which pressurized air can pass. This serves to force the layers of plastics material against the inner surface of the tube at a position downstream of the tubular nozzle. As shown with particular reference to FIG. 3 of U.S. Pat. No. 4,370,186, a second extrusion apparatus downstream of the first extrusion apparatus providing the inner layers, provides respective concentrically disposed outer layers of adhesive and plastics material. A pipe such as that constructed by the method using the extrusion apparatus of U.S. Pat. No. 4,370,186 is now described with reference to FIG. 1 herein, which shows a pipe having a series of concentrically disposed layers A–E, A being an innermost bore layer of plastics material, B a graft adhesive polymer layer, C the metallic layer, D a second graft adhesive polymer layer and E an outer sheath layer of plastics material. The metallic layer C may be of aluminium or other metal, typically metallic foil. In variations of this process, either instead of or in addition to the provision of the adhesive layers B and D, the metallic layer may be etched; see, for example, EP-A-0237234.

Although commercially acceptable piping may be produced by such methods, there are problems associated with using an adhesive, for example, grafted polyethylene, or etching treatment, in securing an overall even thickness.

Moreover, where grafted polyethylene is utilized, a typical thickness would be 0.10–0.15 mm on each side of the metal foil, adding a total sectional thickness of 0.2–0.3 mm to the outer diameter of the pipe.

In addition, during the co-extrusion coating of thin adhesive grafts onto metal foils, problems occur where the adhesive fails to cover the entire area with an even and identical thickness. Thus, when the next layer of plastics material, for example polyethylene, is applied over this graft, bridging of the polymer between adjacent areas of the graft can occur, or zero bonding may occur where no graft exists. This can be seen, for example when a clear sheath is applied over a coloured graft material. This leads to premature hoop failure under hydrostatic pressure. This ability to withstand hydrostatic pressure is known as the hoop strength. Inefficient bonding of the plastics material to the metallic layer by the adhesive can reduce this hoop strength by as much as 20% at ambient temperature, for example from 100 to 80 bar; the ductility of the metal foil will always fail in the area of least graft material.

Another problem associated with the use of grafted polyethylenes as adhesive materials is their relatively low Vicar temperature, measured according to BS2782/102/D/F/J, which for such polyethylenes is in the order of 50° to 85° C. Thus although a crosslinked polyethylene which may form a bore and/or sheath wall of a triple-walled pipe may have a Vicar temperature as high as 120°–140° C., allowing excellent thermal performance whereby the pipe could be used at temperatures within a wide range, such thermal performance is severely limited by the low Vicat temperature of the adhesive which causes a loss of adhesion at high temperature.

Where attempts are made to achieve efficient bonding by etching treatment of the metallic layer, although the tolerance varies less, craters are caused by the etching, which leaves unfilled voids bridged by the polymer. Moreover, although etching treatment produces an improved temperature resistant bond, it is nevertheless environmentally unfriendly and can be neutralised with the piped medium through permeation, again causing hoop stress decay. A yet further disadvantage is that once the foil is treated the etching is prone to handling problems associated with deactivation of the surface.

It can be seen from the above that if it is desired to produce a triple walled pipe which is dimensionally accurate, mechanically and thermally stable in relation to the prevention of delamination and which can perform at considerably high temperatures and pressures, then none of the above processes could be said to be suitable for obtaining optimum mechanical and thermal properties with high chemical and frictional resistance. For example, in the construction of an "ideal" pipe, its optimum physical strengths are attainable only if the overall cross-section of the wall thickness is identical throughout the pipe length, while keeping the wall section thickness to a minimum. Thus, where the wall thickness tolerance varies by more than plus or minus 0.5%, the physical properties of the pipe will be decreased by as much as 20% or more.

SUMMARY OF THE INVENTION

The invention seeks to provide a method and apparatus which produces such optimum properties without the need for etching treatment to a metallic foil, or incorporation of any adhesive interlayer.

Moreover, the invention also seeks to provide a method and apparatus for producing such a pipe within which a gaseous material is hermetically sealed.

We have found surprisingly that it is possible to pretreat a metal, especially aluminium, more especially an aluminium foil, by a cleaning method which does not involve etching and yet which provides a surface more receptive to adhesion directly to a layer of plastics material. In this manner, the requirement for an adhesive may be eliminated, thus allowing a considerable improvement in thermal performance.

Thus, according to a first aspect, there is provided a method of bonding, by extrusion, a layer of plastics material to a layer of metal, which method includes the steps of treating at least one surface of a metallic layer with a treatment gas, preferably a halogen, especially chlorine or fluorine, and more especially fluorine, gas (which such halogen gases may be regarded as suitable cleaning gases), optionally (and preferably) directing a high pressure jet of a gas at, and so as to remove any loose material from the treated surface of, the metallic layer, thereafter passing the metallic layer through high activity ions, obtained, for example, by a corona discharge, preferably in the presence of an inert gas, and applying to the surface of the metallic layer treated with the treatment gas and high activity ions a layer of plastics material.

According to a second aspect, the invention provides an apparatus for surface treatment of a metallic layer comprising (i) a source of a treatment gas, (ii) means for allowing contact of at least one surface of the metallic layer with the treatment gas to provide at least one treated surface thereof, (iii) optionally a cleaning device capable of providing a high pressure gas jet, (iv) means for generating high activity ions, (v) optionally a source of an inert gas, and (vi) means for allowing contact of at least one said treated surface of the metallic layer (a) with the high activity ions and (b) during the said contact with the high activity ions, optionally with the inert gas.

According to a third aspect, the invention provides an extrusion assembly for extrusion of a triple walled pipe, which assembly comprises a first extrusion apparatus for extruding an inner layer of the pipe, which inner layer is of plastics material, which first extrusion apparatus comprises an extruder having an extrusion sleeve and an extrusion die disposed substantially coaxially within the extrusion sleeve, which extrusion sleeve and extrusion die together define, at an axial end of the extrusion sleeve, a first, annular, exit orifice for the plastics material which is to provide the inner layer of the pipe, a shaping sleeve surrounding and substantially coaxial with the extruder of the first extrusion apparatus, which shaping sleeve has a first axial end adapted to receive, and is capable of shaping, a U-section form (hereinafter "U-form") metallic layer passing through it into a tubular configuration, means for welding the metallic layer of tubular configuration to provide a metal tube defining a metallic layer of the pipe, means for supplying a pressurized gas downstream of the first, annular exit orifice whereby extruded plastics material emerging from the said first exit orifice is forced against an internal surface of the metal tube to provide the inner layer of the pipe, and a second extrusion apparatus for extruding an outer layer of the pipe, which outer layer is of plastics material and is disposed radially outwardly of the metallic layer of the pipe, which extrusion apparatus comprises a body part and a supply channel within the body part for supplying plastics material and terminating in a second exit orifice, surrounding the metal tube, for the plastics material which is to provide the outer layer of the pipe, which extrusion assembly has positioning means selected from at least one of, (a) an essentially annular section recess in the body part of the second extrusion apparatus which recess is capable of receiving, preferably with an interference or spring biased fit, a second axial end of the shaping sleeve remote from the said first axial end, which allows accurate positioning of the shaping sleeve relative to the first and second extrusion apparatuses, and (b) a universal joint to which the extruder of the first extrusion apparatus is connected which connection allows accurate positioning of the said first exit orifice of the first extrusion apparatus relative to the said second exit orifice of the second extrusion apparatus.

A particularly preferred shaping sleeve is a one-piece, i.e. single, unit, which may be an integral unit or a unit having two parts held together but separable from one another, for example along a longitudinal plane passing through the sleeve, which sleeve has a shaping axial end region designed to fold the U-form metallic layer, as it passes through the sleeve, into a tubular configuration in which opposed longitudinal edges of the metallic layer are in overlapping relationship to provide a leaf seam and, downstream of the shaping axial end, an opening in a wall of the sleeve arranged to allow access for a welding operation. More preferably, the shaping axial end has a longitudinally extending stop, at an upper region of the internal periphery thereof, capable of receiving an abutting longitudinal edge portion of a metallic layer and thereby preventing further overlap of the longitudinal edge with the opposite longitudinal edge of the metallic layer or tendency for the leaf seam provided by the overlap to rotate from its central position resulting from the presence of the stop.

In a particularly neat and compact design of extrusion assembly the universal joint may be a ball and socket arrangement in which the extruder of the first extrusion apparatus is connected to the ball and the ball includes a supply channel for supplying plastics material to the said extruder.

By providing an extrusion assembly with such a combination of features, vibrations caused, for example, by the pipe welding apparatus are minimised by the said interference or spring fit between the shaping sleeve and the recess in the body part of the second extrusion apparatus, while, should any movement of the extruder of the first extrusion apparatus arise as a result of any such vibration, its position can be readily adjusted by operation of the universal joint.

A particular problem which has been encountered in known systems for the extrusion of laminate pipes is that variations in the speed of travel of the metallic strip, due for example to occasional slippage of the strip with respect to the mechanism which drives it, causes different portions of the strip to spend different respective times in proximity to the extrusion and welding apparatus, thereby leading to non-uniformity along the finished pipe. In particular, underwelding and overwelding may occur in portions of the metallic strip which pass the welding means at higher or lower speeds respectively. In an attempt to alleviate this problem, the apparatus of the present invention is preferably provided with sensing means for sensing one or more operating parameters of the pipe production process, for example the velocity of the metallic layer through the apparatus or the thicknesses of the inner and/or outer layers being formed, and control means for continuously or intermittently adjusting the apparatus in response to the sensed operating parameters, for example by adjusting the rate at which one or both of the first and second extrusion apparatuses extrudes plastics material, and for the operation of the welding means.

A fourth aspect of the invention comprises provision, between an extrusion sleeve and an extrusion die of an extrusion apparatus, of a die supporting member disposed towards an axial end of the extrusion apparatus at which an annular exit orifice is provided, which die supporting member comprises a sleeve coaxial, and providing a press fit, with the die and having a plurality of fins which extend longitudinally between opposite axial ends of the sleeve and radially outwardly so as to terminate in an interference fit with the extrusion sleeve. Thus, we find surprisingly, that by adjustment of the axial length and/or position of the die supporting member relative to the die, then not only is the die supporting member capable of supporting the die towards its axial end at which the exit orifice is provided, but the pressure of polymer passing through the orifice can be adjusted at will to provide the desired exit conditions and higher extrusion speeds for efficient coating of a layer of plastics material, for example, onto the internal surface of a metal tube defining the metallic layer of a triple walled pipe.

We also find, surprisingly, that in an extrusion assembly in which metal sheet is formed by a shaping sleeve into a metal tube around an extrusion sleeve of an extrusion apparatus for extruding plastics material onto the internal surface of the metal tube, particular efficient passage of a metallic sheet through the extrusion assembly can be achieved by coating the internal surface of the shaping sleeve with lithium doped quartz. Moreover, such passage of the metal can be improved by coating the external surface of the extrusion sleeve with diamond. The unique combination of lithium doped quartz on the shaping sleeve forming the metal tube and diamond on the extrusion sleeve of the extrusion apparatus for extruding the plastics material provides particularly excellent results. The provision of such respective coatings on the shaping and extrusion sleeves represents fifth and sixth aspects of the invention.

According to a seventh aspect, the present invention provides a method of modifying an internal surface of a laminate pipe, which laminate pipe has an inner layer of plastics material providing the said internal surface, a metallic layer radially outwardly of the inner layer of plastics material and optionally at least one outer layer radially outwardly of the metallic layer, which method comprises pressurising molten said plastics material against the internal surface of a metal tube which is to form the metallic layer of the laminate pipe, by means of pressure of a fluid, especially a gas, reactive with the molten plastics material, thereby chemically modifying the surface of the plastics material, for example, so as to improve its chemical resistance and/or anti-friction properties. An especially preferred such fluid is fluorine gas.

The method is especially useful for providing a triple walled pipe having a metallic layer sandwiched between inner and outer layers of plastics material, the internal periphery of which triple walled pipe is chemically modified.

According to an eighth aspect, the invention provides a method of producing a pipe having a metallic layer at least the internal surface of which is coated with a plastics material and which pipe contains hermetically sealed fluid, especially gaseous, material, which method includes the steps of extruding onto the internal surface of the metallic layer a layer of plastics material under the influence of a pressurized fluid medium acting with the pipe and thereafter sealing respective opposite axial ends of the pipe to retain the fluid material within the pipe.

In an especially preferred method, the fluid used to pressurise the plastics material during coating thereof onto the metallic layer of the pipe is a fluid capable of modifying the surface properties of the pipe, so that, on hermetically sealing the fluid material within the pipe, the fluid material may continue, for example at ambient temperature, to modify the plastics material providing the internal surface of the pipe.

Methods and apparatus embodying the invention will now be described in more detail with reference to FIGS. 2–8 of the accompanying drawings.

BRIEF DESCRIPTION OF THE DRAWINGS

FIG. 3w shows in more detail a "spider" device for supporting an extrusion die and controlling polymer flow through an extruder of a first extrusion apparatus of the extrusion assembly of FIG. 3;

FIGS. 3x, 3y and 3z show various stages of metal tube formation as metal foil passes through the extrusion assembly of FIG. 3;

DESCRIPTION OF PREFERRED EMBODIMENTS

Figure 2:
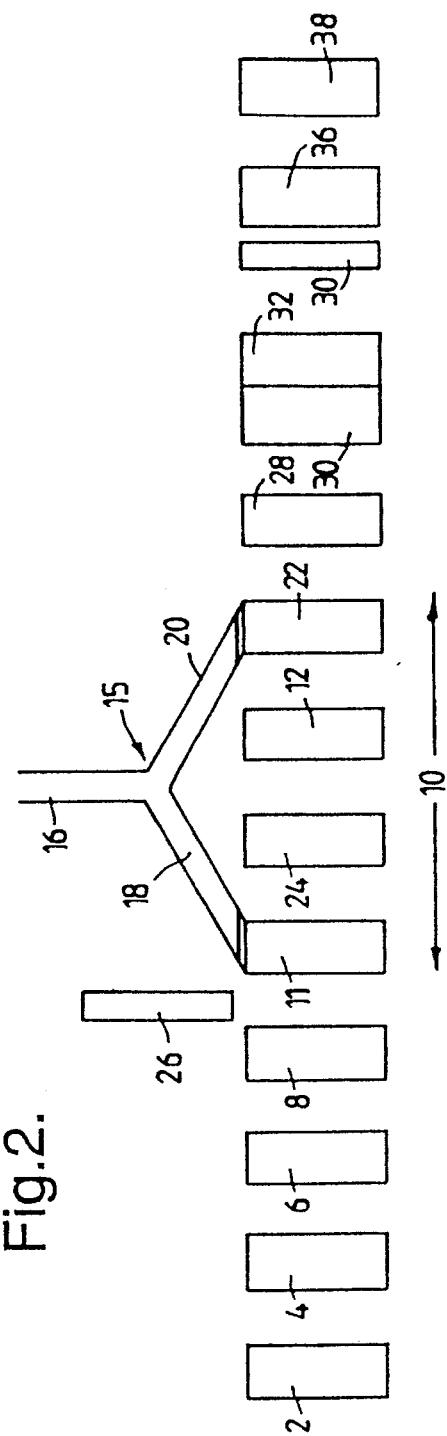
FIG. 2 is a flow diagram illustrating a preferred method embodying the invention for providing a triple walled pipe.

Referring firstly to FIG. 2, reference numeral 2 represents a flat metallic sheet, preferably a foil of about 100–300 µm, more preferably 200–250 µm, e.g. 220 µm, which may be, for example, aluminium, copper, mild steel or any alloy combination. The foil 2 may be treated firstly in a degreaser 4 where it is treated at 10°–100° C., preferably 60° C., with a solvent for grease, for example, methylene chloride, trichloroethylene or "tetrabromide" cleaning agent ("tetrabromide" is a trade mark for a commercially available bromotrifluoromethane). This degreasing is especially preferred for steel or copper foil. Alternatively (as is preferred for an aluminium foil) or additionally (as is preferred for steel or copper foil), and especially where the foil is covered with milling grease, it may be treated, for example, in a chamber 411 of FIG. 4, where it comes into contact with a treatment gas, for example, fluorine gas. The sheet 2 then passes through a charging zone 6, for example, chamber 412 again shown in FIG. 4, where it comes into contact with highly polar ions resulting from a corona emitter in the presence of an inert gas preferably at atmospheric pressure. The metal foil is then formed into a U-shaped configuration by a shaping die 8 shown in more detail in FIG. 7.

The U-form foil is drawn through an extrusion assembly 10. Firstly it passes around a forward axial end 306 of an extrusion sleeve 302 of an extruder 24 of a first extrusion apparatus (see FIG. 3) and around a plastics material supply arrangement 11 including a ball and socket (FIG. 3). The U-form foil is thereafter shaped and welded by means of a shaping device 12 comprising a shaping sleeve 600 shown in more detail in FIG. 6 and cooperating with a welding wheel 301 as shown in more detail in FIG. 3. The metal tube 40 thus formed then passes out of the extrusion assembly 10.

Meanwhile, a polymer extruder generally indicated as 15, having an extrusion die part 16 forwards plastics material along respective conduits 18,20 in a cross-head 350 (see FIG. 3) of the extruder 15 on the one hand to the first extrusion apparatus (including plastics material supply arrangement 11 and extruder 24) which extrudes plastics material for the inner, bore layer of the triple walled pipe and on the other hand to a second extrusion apparatus 22 which extrudes plastics material for the outer, sheath layer of the triple walled pipe. The plastics material from supply arrangement 11 passes through the extruder 24 and leaves the extruder 24 at an annular exit essentially coaxial with an annular exit of the second extrusion apparatus 22. Thus, as the metal tube 40 passes out of the extrusion assembly 10 it is provided simultaneously with respective inner bore and outer sheath surface layers of plastics material.

Extrusion of the plastics material onto the internal surface of the metal tube 40 is carried out under the influence of a gaseous material under pressure. When it is desired to modify the plastics material at the internal periphery of the pipe (as later described in more detail) this gaseous material may be taken from a source 26 which also supplies chamber 411 of FIG. 4 with fluorine gas for cleaning metal foil 2.

After the triple walled pipe has been formed, it is fed to a crimper 28, located within a first cooling bath. The crimper serves to compress the pipe at various positions along its length and thereby seal gaseous material within it. The pipe then passes through second and third cooling baths 30 and 32 respectively, then past an x-ray camera 34 and is fed by a hauler tractor 36 to a pipe coiler 38.

In order to set up the process, sheet in U-form is merely pulled through the extrusion assembly 10, where it becomes tubular, then through crimper 28 and the three cooling baths, past the x-ray camera 34 to the hauler tractor 36, which then runs automatically and also feeds the finished pipe to the pipe coiler 38.

The various individual stages within the process will now be described in more detail.

Figure 4:
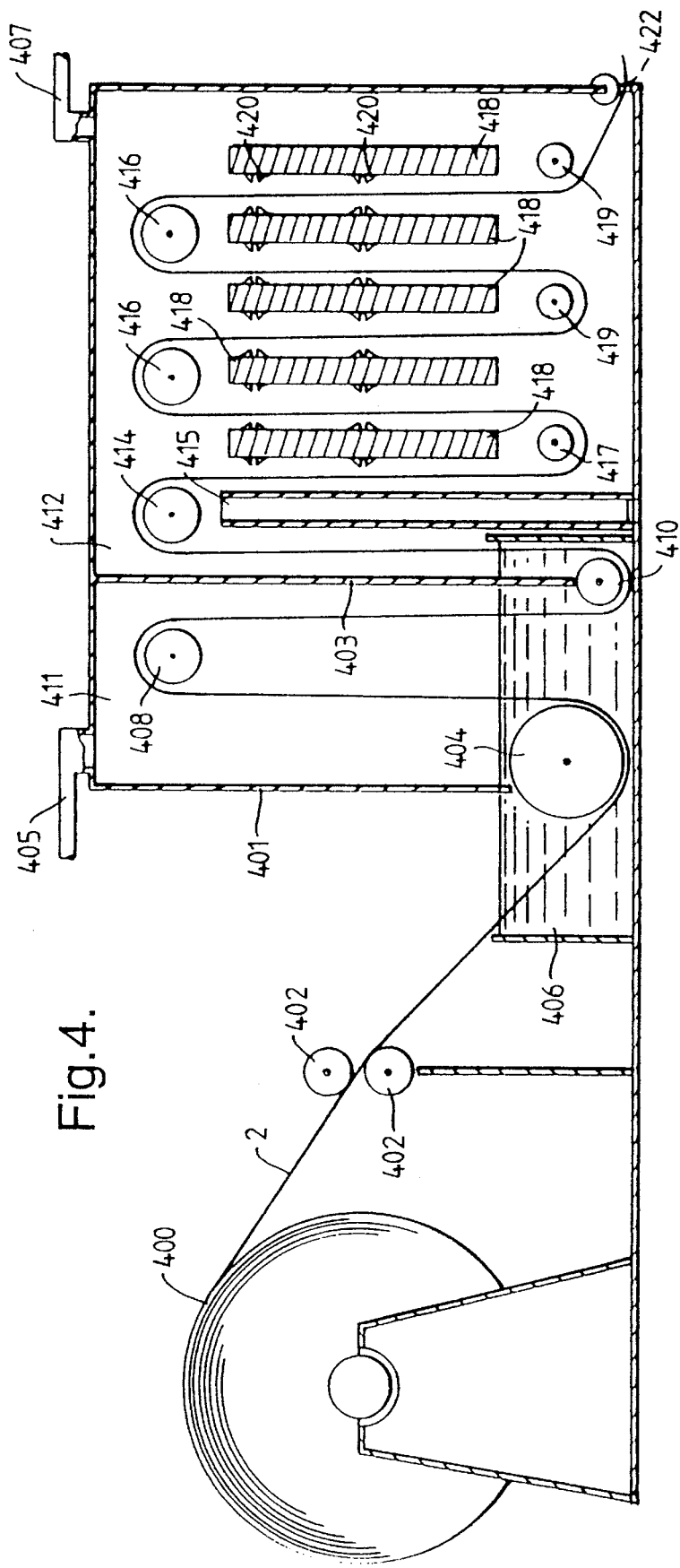
FIG. 4 illustrates apparatus for pretreatment of metal foil which is to form a tubular metallic layer of a triple walled pipe.
Figure 5:
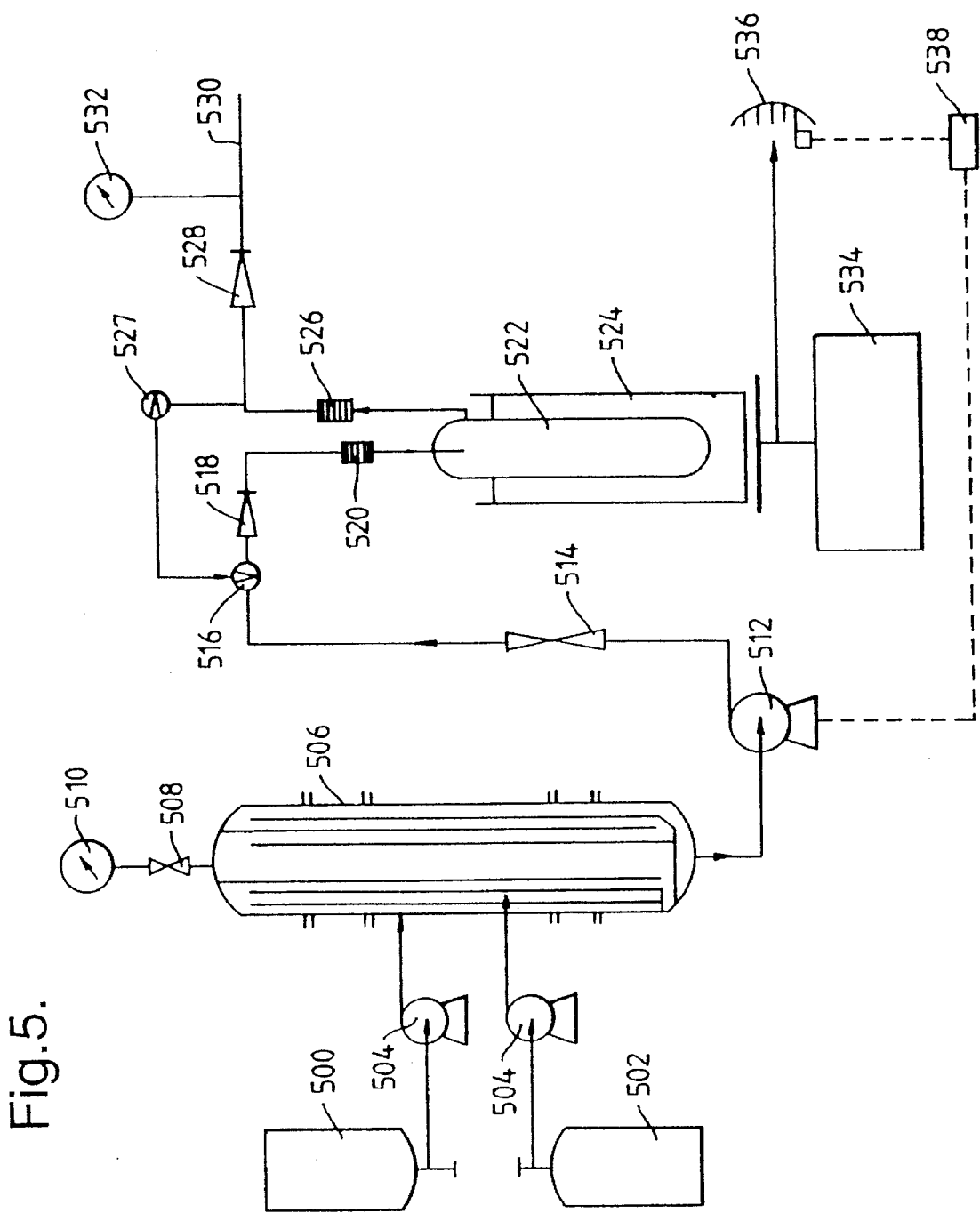
FIG. 5 is a schematic diagram of an apparatus suitable for providing a source of fluorine gas.

Reference is made firstly to FIG. 5 which illustrates a gas supply plant for supplying, in particular, a mixture of fluorine and nitrogen for use in both cleaning the metal foil as shown in FIG. 4 and for pressurising the plastics material onto the internal surface of the tube as shown in FIG. 3.

The supply plant of FIG. 5 has a gas supply container 500 containing nitrogen at, for example, 200 bar and a gas supply container 502 containing fluorine at, for example, 100 bar. Respective volumetric pumps 504 feed nitrogen and fluorine to a gas blender 506 provided with integrated cooling and a pressure relief valve 508 and pressure gauge 510. A mixture of nitrogen and fluorine gases is then fed by a volumetric pump 512 through a check valve 514 and electronic pressure controller 516 to a pressure retarder 518 and thence to a line heater 520 and to a steel container serving as a vaporizer 522. The temperature in the vaporizer 522 is controlled by an oil bath 524 so as to avoid the formation of droplets of fluorine. The resultant vapour then passes through a line heater 526, then under the influence of an electronic pressure controller 527 to a pressure retarder 528 and through output supply line 530 monitored by a pressure gauge 532. The amount of gas mixture in the vaporizer 522 is measured by a balance 534 and indicated by indicator 536. In dependence upon the weight of gas, an electro relay 538 governs the volumetric pump 512 controlling passage of the gaseous mixture from the blender 506 to the vaporiser 522.

The gas supply plant may be operated, for example, so as to supply the gaseous mixture at a pressure of 0.1–1 bar, preferably 0.5 bar and at ambient temperature, so that it is suitable for use in treating the metallic layer as now explained with reference to FIG. 4.

Referring now to FIG. 4, this illustrates an apparatus for treating both surfaces of a metal foil 2, in a chamber 411 filled with blended nitrogen and a treatment gas such as chlorine or fluorine, especially fluorine, to remove grease and surface contaminations and achieve a chemically dry surface, this being achieved by deposition of the treatment gas at micron thicknesses. The sealed surface is then cleaned and thereafter activated in a chamber 412 by application of high activity ions from a high voltage corona discharge emission in the presence of an inert gas. By subjecting the metal foil to this series of pretreatment steps it becomes possible, at a subsequent stage, to deposit onto one or both of its surfaces any of a wide variety of polymer types merely by melt adhesion directly onto the metal foil. Indeed by deposition of polymer under fluid pressure, as later described, the choice of polymer may be even further widened by selecting a particular pressurizing gas suitable for a particular polymer and application of the resulting laminate.

In more detail, metal foil 2 on a reel 400 is fed from the reel 400 through a multi-roll strip tensioner including driven rollers 402 and driven roller 404 located in a bath 406 of an inert oil such as fluorinated oil. Metal foil 2 is fed downwardly into the oil bath 406 and emerges from it into a treatment chamber 411 opposed side walls 401, 403, of which provide respective sealing baffles extending beneath the surface of the oil in the oil bath 406. The treatment chamber 411 is supplied with treatment gas fed to conduit 405 from the gas supply source 26 (FIG. 2) obtained in the manner described with reference to FIG. 5 above. The treatment gas is preferably of a low pressure, more preferably a pressure of 0.1–1 bar, especially about 0.5 bar and preferably at ambient temperature. The oil bath 406 is a sealing bath designed to prevent any escape of toxic treatment gas such as fluorine from the chamber 411 to atmosphere. This treatment with treatment gas, especially fluorine, provides a micron layer of treatment gas on the metallic surfaces thereby sealing them against air-born contamination. Even where the metal foil is covered with milling oil, the treatment gas is capable of penetrating milling oil and forming a micron layer on the surface of the metal foil. It also assists in cleaning the metal foil by reacting with any milling grease and any water induced oxide which may be present. Although it may thus remove at least some of the oxide from the metal, it does not etch the metal and so does not form any unwanted craters or pits. The reaction products of this cleaning operation tend to fall off the metal foil and settle as a brown sludge at the bottom of oil bath 406, any remaining material deposited on the oil being easily removable as described below.

The metal foil 2 emerging from oil bath 406 passes over driven roller 408 and reenters the oil bath 406 to pass under driven roller 410 beneath baffle 403 thus providing, with baffle 401, a double seal. Baffle 403 depends sufficiently deeply into oil bath 406 to prevent the higher (atmospheric) pressure employed in activation chamber 412 from breaking the seal.

The metal foil 2 then passes upwardly out of the oil bath 406 into the activation chamber 412 in which the metal foil is firstly subjected to a blast of high pressure gas and then to a corona discharge treatment. After entering the activation chamber 412 the metal foil 2 passes over an upper driven roller 414 disposed above a cleaning device 415 and then downwardly to a lower roller 417 so that the metal foil again passes the cleaning device 415. The cleaning device 415 provides jets of a gas at high pressure, preferably about 100 psi (5 bar), which pressure is adjustable in dependence upon the amount of sealing oil present on the foil. The gas jet blasts off any remaining debris remaining on the foil after its passage through treatment chamber 411 prior to corona discharge treatment. The gas supplied to the cleaning device 415 may be any suitable gas at any suitable temperature. For example, where any moisture is present, a dry gas is usually preferred. This may be an inert gas such as nitrogen, helium or argon, but hot or cold dry air may be more preferred. Cold air is often especially preferred. The metal foil 2 then passes alternatively over one of a series of upper driven rollers 416 disposed above, then beneath one of a series of lower rollers 419 disposed below, a plurality of non-conductive, preferably carbon, rods 418 opposite faces of which each carry spaced apart electrodes 420, preferably ceramic electrodes. The upper (416) and lower (417, 419) rollers are arranged so that a lower roller 417 is disposed directly beneath a first rod 418, then an upper roller 416 is disposed directly above a second rod 418, and then the next lower roller 419 is disposed below a third rod 418, adjacent the second rod 418, and so on. Thus, as the foil 2 travels over and beneath respective alternate upper (416) and lower (417, 419) rollers it defines alternate upwardly and downwardly opening cavities within each of which sits a respective rod 418. In this manner, opposite surfaces of the foil are treated by the electrodes carried by alternate respective rods 418. The treatment chamber 412 contains an inert gas, preferably at atmospheric pressure, supplied by gas conduit 407 and the electrodes 420 provide an intense corona discharge which causes deposition of high activity ions. In this sputtering technique, discharge is generated between the electrodes and the metal in the ionizing atmosphere and implants positive ions on the metal surface. In some cases, it may be desirable to intensify the discharge by moving the electrodes 420 nearer to the metal surface. The positions of the respective rods 418 carrying the electrodes 420 are therefore adjustable so that the desired distances between the foil and electrodes may be selected at will. The metal foil having been microscopically sealed to prevent formation of an oxide on the surface or possible wetting of the surface, at least at an atomic level or possibly hygroscopically, whilst at the same time increasing the surface receptivity to implantation with active ions creates a new, very dry, hard, permanent and polymer receptive substrate. To enhance the surface further for extrusion specifically of fluoropolymer, a polysiloxane plasma application is preferable, this preferably being carried out at a temperature of from ambient to 175° C., preferably 80°–90° C. The treated metallic foil leaves the activation chamber 412 at exit 422. Care must be taken to avoid damaging surface by, for example, scouring or scratching.

Figure 7:
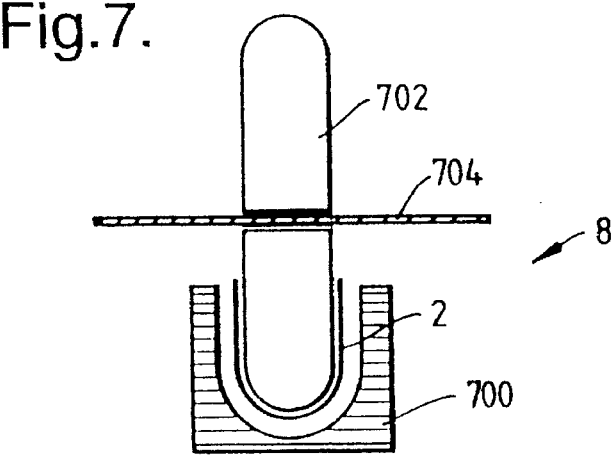
FIG. 7 illustrates an apparatus for forming a U-form metallic foil strip from a flat sheet of metal foil.

The treated metal foil 2 is then folded into a U-form using a device 8 such as that shown in FIG. 7. Here, the metal foil 2 passes between a transforming die 700 and a lithium quartz wheel 702 rotatable by a driving spindle 704 at the speed of the hauler tractor 36 and at a temperature preferably of 20°–100° C., more preferably 22° C. The transforming die 700 is preferably of plastics material, more preferably a non-crosslinked high molecular weight polyethylene, even more preferably lined with PTFE.

A method of shaping the U-form metal foil into a metal tube 40 is now described in more detail with reference to FIG. 6, FIGS. 6-1 and 6-2 of which illustrate respective opposite axial ends of a shaping sleeve 600 of a tube forming device. The shaping sleeve 600 is a block which has a longitudinal cross section which is generally rectangular and a lateral cross section which is generally square, the block having a generally cylindrical bore 601 passing axially through it.

An axial end part, Generally indicated as 603, of the sleeve 600 has a generally U-shaped section entry port 602 for receiving the U-form metal foil. The entry port 602 is open at its upper end, which upper end tapers inwardly so as to close progressively. However, before complete closure, port 602 leads to a generally frusto-conical part 604 of the sleeve 600, which part 604 also closes progressively. A partly open entry generally indicated as 605 of the frusto-conical part 604 provides respective upper arcuate edges 607, 609 extending, longitudinally of the sleeve 600, from the U-section entry port 602 generally upwardly and inwardly so as to terminate at a generally central apex region 615 of an upper surface 612 of the sleeve 600. At the generally central apex region 615 one arcuate edge 609 terminates axially inwardly of the other arcuate edge 607 so as to provide a longitudinally extending edge stop 617, which together with arcuate edge 609 defines a recess 617 in upper surface 612 of the sleeve 600.

Axially inwardly of the apex region 615, the frusto-conical part 604 has a closed portion 625 the internal periphery of which is profiled, at least in a generally central apex region, so that in any given circumferential plane, in a clockwise direction the diameter progressively reduces, then in a radial plane suddenly increases and thereafter (in a clockwise direction) remains practically unchanged, at least in the apex region 615. This sudden increase in diameter provides a longitudinally extending stop ridge 619 coplanar with and facing the same direction as longitudinally extending edge stop 617. In an alternative form, longitudinally extending stop ridge 619 is defined by a profile, at least in the generally central apex region 615, which is such that in any given radial cross-section, in an anti-clockwise direction the diameter progressively increases, then in a radial plane suddenly decreases and thereafter (in an anti-clockwise direction) remains practically unchanged. If desired, as the frusto-conical part 604 extends axially inwardly of the sleeve 600, so the depth of the stop ridge 619 may decrease until stop ridge 619 disappears. The edge stop 617 and stop ridge 619 together define a foil stop disposed generally in a radially uppermost region relative to the bore 601 of the sleeve 600. However, the foil stop may be displaced circumferentially from the uppermost region by up to 5°, either clockwise or anti-clockwise. If displaced in an anti-clockwise direction as shown in FIGS. 6-2 and 6-3, edge stop 617 and stop ridge 619 preferably face a clockwise direction as shown in FIG. 6, while if displaced in a clockwise direction they preferably face an anti-clockwise direction.

Figures 1, 6:
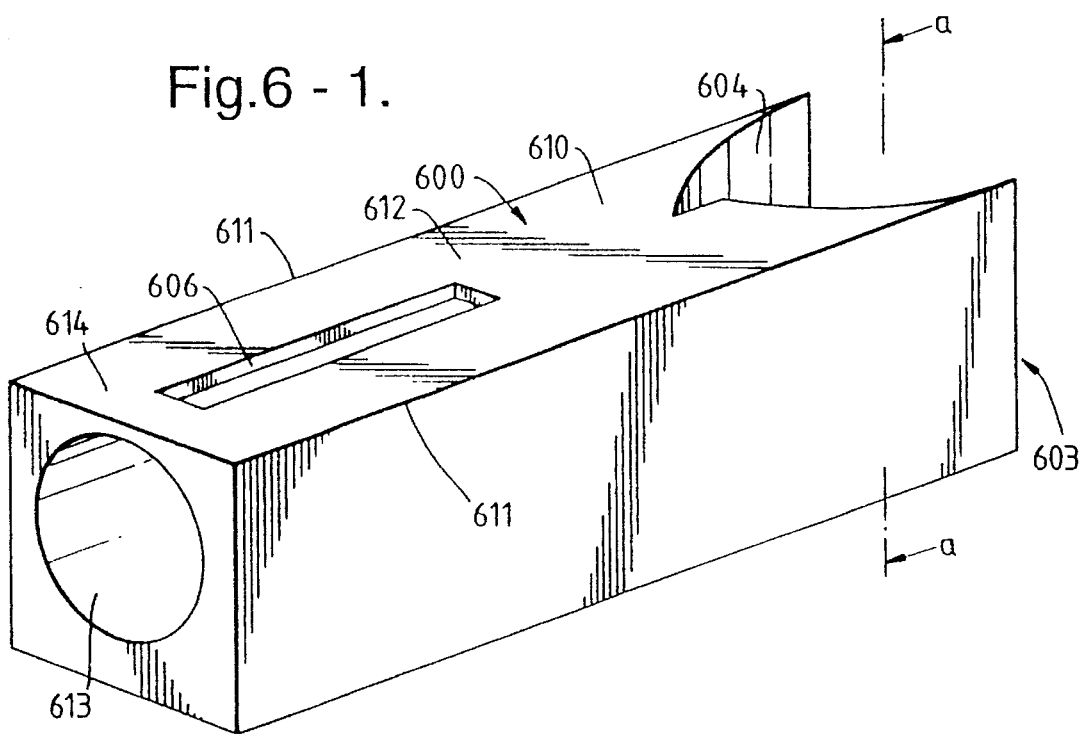
FIG. 6 illustrates a shaping sleeve for forming a U-form metallic foil strip into a tubular metallic layer, FIG. 6-1 being a perspective view of the shaping sleeve and showing an axial end from which a formed metal tube leaves the shaping sleeve, FIG. 6-2 being a perspective view of the shaping sleeve from the direction a—a shown in FIG. 2 and showing an axial end into which a U-form metal foil to be shaped is drawn and FIG. 6-3 being a cross section on the line b—b of FIG. 6-2.
Figures 2, 6:
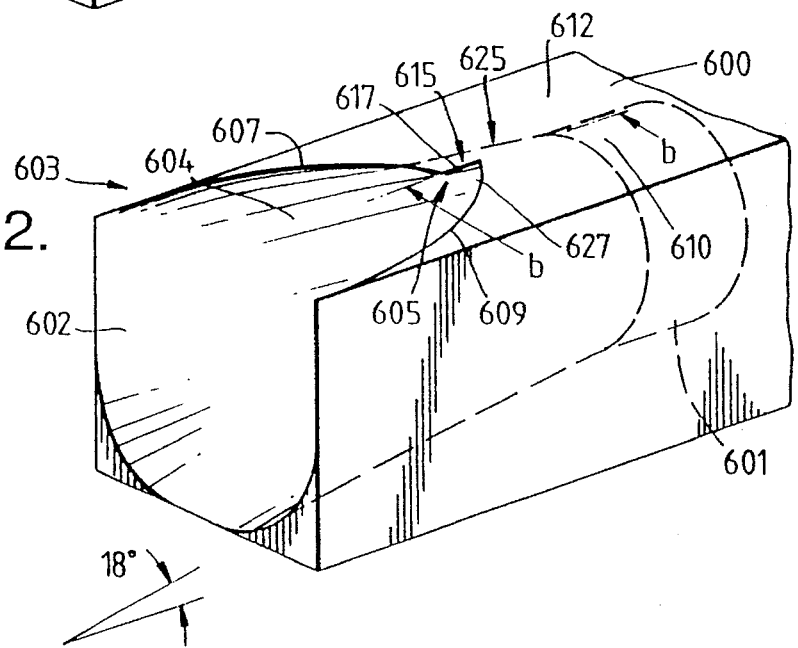
Figures 3, 6:
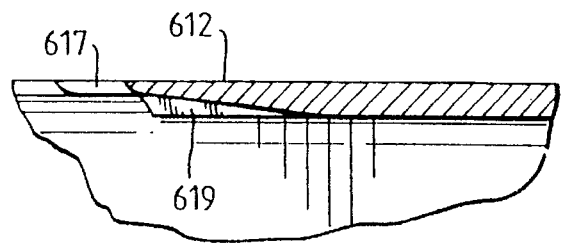
FIG. 3 illustrates an extrusion assembly for forming a tubular metallic layer and extruding onto it inner and outer layers of plastics material.

The frusto-conical part 604 preferably has a cone angle of about 18° as indicated in FIG. 6-2 and has an internal bore which leads into cylindrical bore 601.

Towards an axial end 614 of the sleeve 600 remote from axial end part 603, an upper surface 612 of the sleeve 600 has in it a longitudinal slot 606. Slot 606 is disposed generally centrally between opposed longitudinally edges 611 of upper surface 612.

As the U-form metal foil is drawn into axial end part 603 of the shaping sleeve 600, it is received by entry port 602 of U-shape section and passes into frusto-conical part 604 the profile of which causes progressive folding of lateral flaps of the U-form metal foil until it assumes a generally tubular configuration. As shown in FIG. 3x, as the foil is folded, a small overlap is provided between opposed longitudinal edge portions of the foil, which overlap extends longitudinally beneath, and generally centrally between opposed longitudinal edges 611 of upper surface 612 of the shaping sleeve 600 as shown at 610.

As will be appreciated, as the foil is folded into tubular configuration, a lower leaf of the overlap folding in a clockwise direction will pass under longitudinally extending edge stop 617, while the recess 627 in upper surface 612 of the sleeve 600 will allow an upper leaf of the overlap to pass in an anti-clockwise direction over the lower leaf. However, further anti-clockwise movement of the upper leaf is limited by edge stop 617.

As the foil then passes through the closed portion 625 of the frusto-conical part 604, so opposed longitudinal edges of the foil are brought into further overlap and closer contact with one another as shown in FIG. 3y. However, again further overlap by anti-clockwise movement of the upper leaf is prevented by ridge stop 619, while as a result of the overall profile of the internal periphery of the closed part of the frusto-conical part 604 further clockwise movement of the lower leaf of the overlap ceases so that a stable tubular configuration is provided well before the tube reaches slot 606.

When the foil passes beneath slot 606, it is sealed by the action of a sonotrode welding wheel shown in more detail with reference to FIG. 3 and operable at any temperature, preferably between ambient and 300° C., more preferably 200°–230° C.

The metal tube 40 thus formed by welding passes out of exit port 613 at axial end 614 of the shaping sleeve 600.

Thus, the tube formation can be carried out quickly and efficiently over a particularly short distance using a one-piece unit which both shapes the metallic layer and allows access for the welding operation; contrast the arrangement in, for example, GB-A-2223427.

Although in use the shaping sleeve 600 is a one-piece unit, this does not of course imply that it is necessarily formed as an integral member. Indeed, for ease of construction, and especially of maintenance, of the apparatus it is preferable that the shaping sleeve 600 is formed in two parts held together but separable from one another for example along a longitudinal plane passing through the sleeve 600. For example the sleeve 600 may be in two halves, divided by the horizontal plane which, in use contains the axis of the extrusion die 304. The two parts may be secured together releasably, for example, by screws, so that when necessary, it is possible by separating the two parts to gain access to the first extrusion apparatus.

Referring now to FIG. 3, it can be seen that sonotrode 301 is disposed above shaping sleeve 600 and protrudes into slot 606, so as to abut the foil 2, then of tubular configuration, beneath it.

Shaping sleeve 600 is coaxial with an extrusion sleeve 302 of an extruder 24 of a first extrusion apparatus described in more detail below, a gap 380 being provided to allow passage of the metal foil between them. In addition to its role in extrusion, the extrusion sleeve 302 also serves as an anvil to a welding head provided by sonotrode 301, as illustrated schematically in FIG. 3z.

It will be appreciated that the gap 380 between the extrusion sleeve 302 and the shaping sleeve 600 is of limited clearance for the passage of the metal foil. Where the metal foil is of 0.2 mm thickness there would be a clearance of only 0.03 mm between the shaping sleeve 600 and the extrusion sleeve 302. Therefore, the need arises to reduce the surface friction between these sleeves and the metal foil. Constraints upon passage of the metal foil between the sleeves are particularly severe at high temperatures. In particular, the extrusion sleeve (which is usually at a temperature of 200°–300° C.) will tend to expand outwardly and radially at such high temperatures. On the other hand, the shaping sleeve 600 will, by convection, absorb some of the heat from the extrusion sleeve 302 and will therefore likewise expand, or on losing heat contract. These thermal movements are sufficient to cause increased friction and therefore the extrusion sleeve 302 is preferably coated with diamond, for example, by the tribohesive transfer technique at about 5000–20000 rpm, changing the diamond structure from cubic to hexagonal with; a thickness preferably of 10–100Å, more preferably 25Å. In the event that the metal foil were to stop moving during the welding process, this coating would then prevent the snagging or bonding of the metal foil to the anvil section of the extrusion sleeve and also preserve the metal foil treatment.

Likewise, in order to reduce the surface friction between the tube shaping sleeve 600 and the metal foil, the shaping sleeve 600 is produced from a cast and machined lithium doped quartz crystal structure which below 350° C. shows a thermally induced expansion lower than $5\times10^{-6}$ and a surface friction coefficient in the region of 0.01.

The shaping sleeve 600 may be constructed so as to incorporate within it a filament wound heating element so as to assist in the control of the temperature in conduit 328 within the extrusion sleeve 302, during the extrusion of the plastics material within it, which temperature may be as high as about 350° C., but is typically 200°–240° C., for example 220° C.

As the metal foil proceeds under the sonotrode welding wheel, the overlapping edges of the foil are interfacially welded. It has been found prudent to have the configuration of the welding wheel such that it can be pre-loaded in a vertical direction with predetermined weights within the range of 100–10000 grams and a sonotrode amplitude of 30–100% of its full range capability of 18–22, preferably 20 Khz. It has also been found desirable to obtain a controllable torque with a speed ramp in unison with the amplitude output so as to prevent any loss or reduction of ductility of the metal foil within the region of a 2–5 mm width of the welding seam. The sonotrode itself should also be of sufficient width and concave contour so as fully to compress the entire width of the overlap foil and thereby provide a seam sufficiently wide to prevent a tangential protrusion which would otherwise result if the sonotrode did not fully cover the edge (see FIG. 3z). However, the sonotrode should not be so wide that it comes into contact with a single layer part of the metal foil; otherwise the metal foil would be subjected to a pressure by the sonotrode which might be sufficient to damage the foil.

The welding wheel may have a knurled outer periphery as in a conventional welding wheel. However, we prefer to use a welding wheel provided with two spaced apart circumferential ribs providing two distinct spaced apart weld lines along the seam of the overlapping metal foil.

The welding wheel may be operated merely by its frictional contact with the moving foil drawn by the hauler tractor 36, in which case its peripheral speed will be essentially the same as the speed of the foil. Alternatively, the welding wheel may be operated by any suitable drive motor such as an electric, air drive or hydraulic motor or a dynamotor. Either a direct or belt drive may be employed and such operation may be either dependent or (as in GB-A-2223427) independent of the hauler tractor 36 controlling the travel speed of the metal foil as desired. The welding wheel and metal foil may, if desired, travel at the same speed as one another, and may be synchronised with one another.

However, we find that control of the sonotrode merely to match the speed of the hauler gives a very poor response to slippage of the pipe relative to the hauler. As described below this can cause overwelding or underwelding.

We also find, surprisingly, we find that some improvement in welding may be achieved merely by the course adjustment of running the metal foil at a speed slower, preferably about 10% slower, than the peripheral speed of the welding wheel. We believe such improvements arise because (a) the welding wheel remains in contact with the metal foil for a longer period of time and (b) as the hauler 36 pulls against the brake action of the welding wheel, the metal foil is subjected to a slight tension at a region beneath and immediately ahead of the weld and is thereby "swaged" onto the extrusion sleeve 302 producing a more stable metal tube dimension.

However, an even greater improvement in welding can be achieved using the more sophisticated arrangement described in more detail later with reference to FIG. 8.

As can be appreciated from the above description, each of the shaping sleeve 600, extrusion sleeve 302 and sonotrode 301 cooperate to provide a tube forming device in which the overlapping longitudinal edges of the metal foil follow a constant path beneath the sonotrode, thus providing a particularly accurate and consistent welding operation.

Extrusion of the inner and outer layers of plastics material onto respective opposite surfaces of the metal tube 40 will now be described in more detail.

As explained above, a first extrusion apparatus has an extruder 24 comprising an extrusion sleeve 302 and an extrusion die 304 disposed coaxially within extrusion sleeve 302.

At one axial end 306 of the extrusion sleeve 302, the extrusion die 304 has an axial end part 308 of a diameter only slightly less than the internal diameter of the extrusion sleeve 302 so as to be supported by it. At axial end part 308 the extrusion die has a screw thread (not shown) at its outer periphery cooperable with a corresponding screw thread (not shown) on the internal periphery of extrusion sleeve 302. However, forward axial movement of the extrusion die 304 within the extrusion sleeve 302 is limited by cooperation on the one hand of a frusto-conical part 310 of the extrusion die 304 which is disposed axially inwardly of axial end part 308 and tapers inwardly of the extrusion sleeve 302 with, on the other hand, a corresponding frusto-conical annular wedge part 312 extending inwardly from the internal periphery of extrusion sleeve 302. Frusto-conical part 310 of extrusion die 304 leads from axial end part 308 to a die portion 314 of reduced diameter, which at its axial end remote from axial end 308 has a frusto-conical part 316 tapering radially outwardly from die portion 314 and extending axially out of an axial end of extrusion sleeve 302. An axial end part 318 of extrusion sleeve 302 tapers frusto-conically outwardly at an angle essentially the same as that of frusto-conical part 316 so as to provide an annular exit orifice 322. Although not shown in FIG. 3, each of extrusion sleeve 302 and extrusion die 304 consists of two elongate half portions screwed together at a position roughly central of extruder 24. In this way, the respective half portions can be introduced into the extrusion assembly 10 from opposite ends and then screwed together.

For fine adjustment of the thickness of the inner layer of plastics material, the die swell may be controlled by adjustment of the longitudinal position of the die 304 relative to the extrusion sleeve 302. Adjustment may simply be by a manual reselection of the degree to which the extrusion die 304 is screwed into the extrusion sleeve 302. More usually, however, the connection between the extrusion sleeve 302 and the die 304 is via a fitting which is provided with motorized adjustment means (not shown in the figures). For example, a linear motor may be provided which is capable of rotating the extrusion die 304 within the extrusion sleeve 302 so as to adjust, by a screwing motion, the connection between them. The maximum permissible travel of the extrusion shaft relative to the extrusion die 304 is preferably within the range 0.01–10.00 mm.

The first extrusion apparatus has a first supply channel 326 for supply of plastics material. Supply channel 326 is disposed axially inwardly of axial end part 306 of the extrusion sleeve 302 and adjacent an axial end of die part 314 of the extrusion die 304 and enters radially into extrusion sleeve 302 thus enabling supply of a plastics material into an annular section conduit 328 between extrusion sleeve 302 and extrusion die 304, which plastics material can then emerge through annular exit orifice 322 of the extruder 24 of the first extrusion apparatus for application to an internal surface of the metal tube 40, thereby providing an inner, bore layer of a triple walled pipe.

As mentioned above, one axial end 308 of extrusion die 304 is supported by an axial end part 306 of extension sleeve 302. At its axial end remote from axial end 308, the extrusion die 304 is supported by a "spider", generally indicated as 360, disposed towards but upstream of the frusto-conical part 316 of extrusion die 304 and shown in more detail in FIG. 3w. The "spider" 360 consists of a sleeve 362 surrounding the die 304 at its die portion 314 and providing a press fit with the die portion 314 so as to be capable of sliding along it to any desired position, which position is adjustable at will upon assembly of extruder 24, but which spider preferably lies as close as possible to the frusto-conical part 316. The sleeve 362 carries a plurality, preferably four, fins 364 which extend longitudinally along the sleeve 362 and radially outwardly so as to terminate in an interference fit with the internal periphery of extrusion sleeve 302. Thus, firstly, the spider 360 provides support for the die 304 at a distal axial end additional to that provided by the extrusion sleeve 302 in contact with opposite axial end region 308 of the die and centres the die 304 within the extrusion sleeve 302. Moreover, it is found surprisingly that such a spider has not only a supporting function but also acts as a polymer flow stability enhancer to enable higher extrusion speeds to be employed and also providing an accurate adjustment of the pressure of the plastics material passing through the exit orifice 322 between frusto-conical part 316 of extrusion die 304 and frusto-conical end part 318 of extrusion sleeve 302.

The precise location and length of this spider 360 are dependent upon the newtonian flow, molecular weight distribution, melt flow index and other polymer characteristics which influence and determine the dimension of the orifice 322, whilst taking advantage of the die swell characteristics in forcing the polymer against the inner wall of the welded metal tube.

For example, with the spider 360 located essentially adjacent the frusto-conical end part 316 of the extrusion die 304, then for a crosslinked polyethylene polymer, its length may be as short as 1 mm or as long as 10 mm and is preferably about 6–8 mm, while for a fluoropolymer such as a fluoroethylene-propylene polymer, especially such a polymer having a stable molecular weight distribution, the length of the spider may vary from 5 to 30 mm, preferably about 14–16 mm.

In particular, for a polymer with constant molecular weight distribution, the axial end of the spider 360 remote from the annular exit orifice 318 of extruder 24 may be disposed further upstream than for a polymer of more variable molecular weight distribution.

Radially outwardly of the extruder 24 of the first extrusion apparatus and surrounding the frusto-conical part 316 of the extrusion die 304 is disposed a second extrusion apparatus 22 comprising a body part 370 and within the body part 370 a second supply channel 334 which enables supply of plastics material through a second exit orifice 346 onto, an outer surface of the metal tube 40 thereby providing an outer, sheath layer of the triple walled pipe.

Optionally each of the first (326) and second (334) supply channels of the respective first and second extrusion apparatuses may be fed with plastics material from a common extruder 10, via respective conduits 18, 20 (FIG. 2). Alternatively, conduit 20 leading to the second supply channel 334 of the second extrusion apparatus 22 can be blocked off and the second supply channel 334 fed from a coextruder containing a polymer composition different from that supplied to the first supply channel 326 of the first extrusion apparatus. In such compositions, the polymer component may be the same, the respective compositions being, for example, merely of different colour, or the respective compositions may contain respective polymers different from one another in any of, for example, molecular weight, melt flow characteristics and chemical constitution. In this way, the properties of the respective polymers of the bore and sheath layers can be varied at will. For example, the sheath may be of polypropylene and the bore of high density polyethylene or vice versa.

Another advantage associated with the provision of a coextruder is that where it is desirable to fit connections and/or terminations particular materials may be fed from the coextruder to allow this. For example, where the connections and/or terminations need to be solvent bonded to the pipe, one of the conduit 18 and the coextruder can be used to supply a polymer capable of solvent bonding, for example, polyvinyl chloride (PVC), to one of the first (main) and second extrusion apparatuses and thereby provide a core or sheath of PVC to be solvent bonded to the fitting, while, if desired, the other of conduit 18 and the coextruder supplies a different polymer. Likewise, where the fitting needs to be thermofused to the pipe, one of the conduit 18 and coextruder may supply, for example, crosslinked polyethylene (incapable of thermofusion but a preferred plastics material for one of the sheath and bore) to one of the first and second extrusion apparatuses to form one of the bore and sheath layers while, if desired, the other of the conduit 18 and the coextruder supplies a polymer capable of fusion bonding such as high density polyethylene to form the other of the bore and sheath layers to which the fitting may then be thermofused. Similarly, where connections of shrink sleeving are provided, for example, of fluoroethylene-propylene, the conduit 18 may supply the first extrusion apparatus with a perfluoroalkoxy polymer (this being an example of a particularly preferred "true" thermoplastic polymer) to form the bore and the coextruder may supply a rigid polymer such as polyethersulphone to form the sheath. Sleeving may then be heat shrunk, and the joints secured, to the rigid polyethersulphone sheath of the pipe using an ultrasonic welder.

During the passage of the plastics material through respective conduits 18,20 (or from any coextruder employed), the plastics is maintained at a temperature typically of 210°–250° C., for example 230° C. When the plastics material reaches first (326) and second (334) supply channels, it is usually maintained at a temperature typically of 200°–240° C., for example 220° C.

The body part 370 of the second extrusion apparatus is provided with a generally annular section recess 336 into which axial end 352 of the shaping sleeve 600 for shaping metal tube 40 makes an interference fit, thus reducing the amount of vibration caused by impulses of the sonotrode welding wheel 301. As illustrated with particular reference to FIG. 6, the shaping sleeve 600 preferably has a cross section, the outer periphery of which defines a square. Thus, the outer periphery of recess 336 then also defines a square. This configuration provides a particularly stable interference fit between axial end 352, of shaping sleeve 600 and recess 336 in body part 370 of second extrusion apparatus 22. At an axial end region 354 of shaping sleeve 600 remote from axial end 352, the shaping sleeve 600 is supported by a stand 356 secured to the ground, or to the extruder crosshead.

Springs, or other resilient elements, are preferably provided between the shaping sleeve 600 and the recess 336, and between the shaping sleeve 600 and the stand 356. As an alternative to the stand 356, the shaping sleeve 600 may be supported along its length by springs connected to a supporting plate fixed to the extruder 15. Whichever mode of support is adopted the provision of springs allows the shaping sleeve 600, although essentially fixed, to move within a central area of about 5° to follow thermal movements and vibrations. When the position of the extrusion sleeve 302 is adjusted, force is transmitted through the foil to the shaping sleeve 600, which is thereby slightly displaced. Thus, fine adjustment of the extrusion sleeve 302 is not precluded by the presence of the shaping sleeve 600 around it. Surprisingly, it is found that the coatings of diamond and lithium-doped quartz provided on the extrusion sleeve 302 and the shaping sleeve 600 respectively are particularly effective reducing the risk of trapping the foil between the extrusion and shaping sleeves 302,600, i.e. force can be transmitted between the coaxial sleeves 302, 600 through the foil without the foil being snagged, for example.

In order to provide accurate adjustment of the position of the annular exit orifice 322 of the extruder 24 of the first extrusion apparatus relative to the second annular exit 346 of the second extrusion apparatus 22, the plastics supply channel 326 of the first extrusion apparatus runs through a ball part 330 within a socket 332 permanently fixed to a cross-head generally indicated as 350 of a polymer extruder 15, which ball and socket arrangement provides a universal joint. The ball is capable of rotation in any desired direction and may be fixed in any desired position of rotation so as accurately to set the position of the annular exit orifice 322 of the first extrusion apparatus in any desired position relative to the second exit orifice 346 of the second extrusion apparatus 22.

Thus, while socket 332 is fixed to the cross-head 350 of extruder 15, the ball carrying the plastics material supply channel 326 and to which extruder 24 is connected can be rotated to and then fixed, by means of a locking device (not shown), in any desired position. In this manner, the concentricity of annular exit orifice 322 relative to exit orifice 346 of the second extrusion apparatus 22 can be optimised so as to compensate for any induced distortion generated by the sonotrode or the head applied to it, or for any vibrational induced movement.

By this means, care can be taken to ensure that each of the first (322) annular exit of the first extrusion apparatus and the second (346) annular exit of the second extrusion apparatus are disposed coaxially with one another. Thus, at one and the same time, the internal and external surfaces of the metal tube 40 can be coated with plastics material. This provides an excellent balance of plastics materials on opposite faces of the metal tube 40.

Moreover, by substantially simultaneous application of the polymers, distortion of the seamed metal pipe due to unequal pressure can be prevented.

Application of the first plastics material to the internal surface of the metal tube is assisted by a pressurized gas, for example, from a source 26 (FIG. 2) connected to an axial end 340 of a gas supply conduit 338 running through the die 304 along its longitudinal axis. Axial end 340 of the gas supply conduit 338 extends axially out of the extrusion die 304 to enable connection to the gas source while opposite axial end 342 of the gas supply conduit 338 extends outwardly of the opposite axial end of the extrusion die 304 so as to terminate at a position 344 where the gas escapes for exertion of pressure onto the plastics material emerging from the first exit orifice 322 of the first extrusion apparatus, thereby forcing the plastics material against the internal surface of metal tube 40 to achieve adhesion of the plastics material directly onto it.

It is desired that pressurised gas is so injected as to maintain a consistent pressure within the pipe and thereby maintain the inner layer of plastics material in contact with the metal tube 40.

The position of axial end 342 of the gas supply conduit 338 may be adjustable for example, by screw threaded engagement of axial end 340 of gas supply conduit 338 with axial end part 308 of extrusion die 304, so that the distance between terminal end 344 of the gas supply conduit 338 and the first annular exit orifice 322 can be controlled at will. Thus, this distance may vary from 10 to 500 mm; for example respective distances (in brackets) for respective temperatures may be as follows: 230° C. (10 mm), 200° C. (100 mm), 180° C. (200 mm), 160° C. (300 mm), 100° C. (400 mm) and 95° C. (500 mm). The optimum extent of the axial end 342 of the gas supply conduit 338 beyond the frusto-conical axial end 316 of extrusion die 304 depends upon the haul speed of the metal foil and should be adjusted so as to prevent a "burn" condition in which the polymeric layer extruded is degraded.

Typically, where the polymer is a conventional high density polyethylene/crosslinked polyethylene mixture, axial end 344 of the gas supply conduit 338 can be located within 1–50 mm of first exit orifice 322.

The gas used to pressurise the plastics material within the pipe may, for example, be compressed air, nitrogen or a blended gas.

In particular, where it is desired to minimize permeation through the plastics material or lower the contact angle between the internal surface of the pipe and fluid passing through it, thereby reducing friction, a gaseous medium reactive with the pipe and preferably blended with an inert gas may be used as the pressurizing gas. Typical examples are fluorine (preferably admixed with an inert gas in a concentration of 0.1 to 5% by volume of total inert gas and fluorine), sulphur dioxide, carbon monoxide and carbon dioxide (preferably in a concentration, in an inert gas, of 0.1 to 25% by volume of total gas), and other gases such as chlorine, bromine or a blend of such in proportions of 0 to 99.5% by volume of an inert gas, typical examples of such inert gases being nitrogen, argon and/or helium.

In particular where, for example, the polymer is of a high density polyethylene of the general formula —$CH_2$—$CH_2$—, it is desirable to change the chemical structure at least of the surface of the polymer defining the internal bore of the pipe and which is in contact with the flowing medium. This can be effected by oxidation of the hydrogen atoms by injection of a precise blend of fluorine and nitrogen gas as the pressurization medium.

For example, it is possible to modify an atomic layer of plastics material at the internal periphery of the pipe represented by a thickness in the order of 100 to 2000Å, thus creating a plurality of fluorine atoms forming a protective sheath over the chain of carbon atoms, so conferring chemical inertness, stability and reduction of surface energies and thereby resulting in low coefficients of friction, as with polytetrafluoroethylene. It will be appreciated that this conversion is not limited to high density polyethylene and may be applied to any plastics, material having at least one aliphatic mono-1 olefin with a maximum of 8 carbon atoms per molecule.

Whilst postfluorination is the normal process for achieving a low magnitude of polymer conversion of about 5%, by application of this gas onto molten polymer, the conversion rate can be as high as 35–45% where the application temperature is of the order of 180°–320° C., preferably 200°–250° C., especially 210°–220° C.

An optimum blend ratio of fluorine to nitrogen is from 0.1 to 5 vol % fluorine of the total volume of fluorine and nitrogen, preferably 1.5 vol % fluorine in 98.5 vol % nitrogen. An optimum application pressure for the blend is 5–10, for example 6–7 bar. In order to achieve this, a pressure controller may be fitted to output supply line 330 of the apparatus shown in FIG. 5.

Optionally, the pressure controller may form part of a device including a multi-position valve on a multi-supply manifold so as to allow selection at will of a particular source of gas, for example, nitrogen, air or blended gas, connected to gas supply conduit 338 and of the pressure at which it is fed.

Where a blended gas, especially a fluorine-containing gas is used as a pressurizing gas, care must be taken to ensure that the gas does not come into contact with the unprotected metal; otherwise deactivation of the ions implanted on its surface by the apparatus of FIG. 4 will occur thus leading to reduced adhesion of the plastics material to the metal tube.

Returning now to FIG. 2, after formation of the triple walled pipe, this passes to a crimping device 28 disposed within a first cooling bath. The crimping device is designed to seal the pipe by compression forces applied at diametrically opposed regions of the pipe so that the pipe is effectively flattened at specific regions whereby mutually opposite internal regions come into contact with one another. Since, initially, the plastics material is still molten, it forms a positive seal upon cooling in the crimped position.

As the crimping device contacts the pipe for a first crimping operation it advances at the same speed as the pipe from an initial to a final position in the bath. It is then released from the pipe and returns to its initial position where it again crimps the pipe in a second crimping operation, thereby trapping gas, such as air, nitrogen or blended gas, within the crimps formed by the respective first and second crimping operations.

In order to achieve adequate cooling, the temperature of the first cooling bath is preferably 10° to 100° C., more preferably 10°–30° C., especially 12°–25° C., more especially 15°–20° C. The length of the bath is preferably about 6 m.

After the completion of the sealing operation, the pipe then advances through two more temperature controlled baths 30,32 each of 6 meters in length, the first bath 30 preferably being at a temperature of from 10° to 60° C., more preferably 12° to 18° C. and the second 32 between 10° to 25° C., preferably 10° to 12° C. This ensures that the pipe is fully stable at its arrival at the hauler tractor 36. Between the cooling bath 32 and hauler tractor 36 is disposed an x-ray camera 34 which photographs the pipe at ambient temperature. This is capable of penetrating the metal foil and providing sufficient definition of the cross sections of the various layers and in particular measures the inner bore diameter of the pipe, and the location of the metal tube relative to the inner and outer layers, i.e. "concentricity". This allows analysis by a computer into real time and portrayal on a cathode ray tube (CRT) set to provide an alarm when the bore diameter, the pipe wall cross sectional thickness or the outer diameter vary outside set tolerances. The CRT set may show all locations, dimensions and set tolerances. The conversion speed from image recognition to real time display may be of the order of 1 microsecond. The hauler tractor 36 draws the extruded triple walled pipe through the extrusion assembly at a speed of from 1 to 50, more usually 1 to 30, especially 5–25, meters per minute. However, the maximum speed is often limited to no more than 20 m/min because at greater speeds the cooling process is difficult to achieve due to the resulting reduction in heat convection from the inner layer of polymer and through the metal foil and outer sheath layer of polymer to the cooling medium.

Finally, the hauler tractor 36 transfers the finished, cooled pipe to a two station auto change coiler 38, where pipe is reeled up to a predetermined reel diameter, then automatically cut, the free end then starting another reel.

Where the pipe pressurising medium has been of an oxidising gas such as fluorine it is possible to reactivate the crimping device once the length of the pipe has been achieved in order to seal the pipe. The gas is thus trapped under pressure within the pipe and the longer this remains so, the depth of polymer conversion is improved. Clearly, prior to use the gas must be removed and this is performed within an isolation chamber evacuating the gas through a conventional neutralising gas scrubber ideally of calcium carbonate. This renders the pipe suitable for sterile applications requiring freedom from contaminants and low interfacial friction between the pipe bore with the medium which is to be conveyed by the pipe.

In particular, using this process, and with optimum selection of the polymeric material for the bore and sleeve for a given application, it is possible to increase the thermal performance and resistance beyond previous limits. By covering the metal with plastics material in this manner, the temperature resistance increases from about 85° C. to allow a constant operating temperature (long term) of 400° C. and a short term operating temperature of 600° C. For those applications requiring steam cleaned or sterilised piping, this can now be performed with the pipe in its operating place; i.e. "cleaned in place" (CIP).

Depending upon whether or not it is desirable to retain the gaseous medium within the pipe, it is possible to vary the length of pipe containing pressurised fluid from as little as 25 meters up to about 8¼ kilometers.

We presently use a tensioner upstream of the sonotrode 301 to keep the foil in tension as the metal tube is produced. The tensioner may be a drive wheel the outer periphery of which has a strong frictional contact with the foil. The applied tension ranges from 5–50 Newtons/mm$^2$. For example a 98 mm wide foil with a thickness of 0.25 mm at a throughput speed of 10 m/min is subject to a tensional force of 240 Newtons.

In many embodiments as explained above the apparatus is provided with a control system including sensing means capable of sensing, and control means capable of subsequently altering, continuously or intermittently, at least one and usually more than one selected operating parameters of the pipe production, especially one or more parameters characterizing the pipe extrusion process. By this means, the longitudinal uniformity of the pipe may be enhanced. For example, after sensing the speed at which the metallic layer passes through the shaping sleeve, the control means may control correspondingly the rate of operation of at least one of the welding means, the first extrusion apparatus and the second extrusion apparatus.

Indeed the velocity of the metal foil, which due to slippage is not necessarily the same as that of the tractor mechanism drawing it, is a particularly useful parameter to sense. If a tensioner is provided then measurements of the tensioner (e.g. the torque thereon) permit accurate measurement of the velocity of the foil. This information may be used in various ways. For example, it can be transmitted to drive means which rotate the sonotrode. It has been found that in this way it is possible to maintain the velocity of the periphery of the sonotrode very accurately at that of the foil, in fact to within 0.01 mm/min.

Alternatively, the measurement may be used to control the tensioner itself, such that it adjusts the tension applied to the foil to match the varying force applied by the tractor, so that the velocity of the foil is kept constant.

Figure 8:
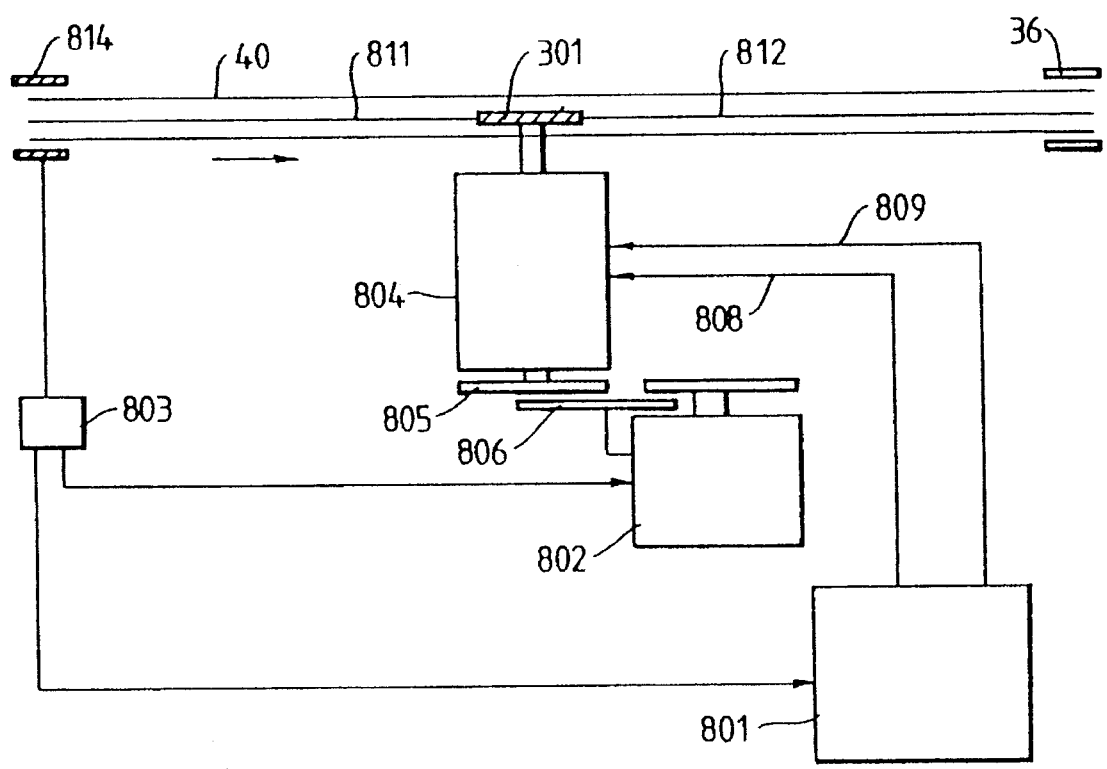
FIG. 8 is a schematic diagram of a preferred control system for an apparatus embodying the invention.

Part of a more sophisticated, and preferred system is shown schematically in FIG. 8. Measurements of the torque on a tensioner 814 are fed to an encoder 803, which for example may be an integrated circuit. The encoder 803 transmits encoded signals to a sonotrode drive motor 802, which is connected, via an electromagnetic clutch 806 and a sonotrode booster 804, to the sonotrode 301. This sonotrode drive mechanism can operate in two distinct modes, namely "drive" and "non-drive" modes. In the drive mode the encoder controls the sonotrode drive motor 802, and thus the speed of the sonotrode 301. In the non-drive mode the electromagnetic clutch is released, decoupling the sonotrode drive motor 802 from the sonotrode 301, so that the sonotrode is driven by frictional contact between its knurled periphery and the metal foil. In at least the non-drive mode, the encoder 803 further transmits signals to an ultrasonic generator 801 which generates the ultrasound directed by the sonotrode wheel into the metal foil. The encoded signals control one or both of the frequency and attenuation of the vibrations emitted by the sonotrode. Control of the frequency and amplitude of the ultrasound transmitted from the ultrasonic generator 801 to the sonotrode booster 804 are schematically indicated by arrows 808,809 respectively. Thus, if the velocity of the foil falls due for example to slippage between the tube 40 and the tractor 36, or to a lesser extent by metal stretching, then this is detected by a tensioner gearbox, and signalled to the encoder 803. The encoder 803 instructs the ultrasonic generator 801 to control the emission characteristics of the ultrasound emitted by the sonotrode 301 in such a way that overwelding is avoided, or at least substantially reduced. Conversely, if the velocity of the tube 40 becomes too high, the ultrasonic generator is controlled so as to substantially reduce, or even avoid, underwelding.

Other components of the apparatus may also be controlled by signals from the encoder 803. For example, the rate of extrusion of plastics material to form the inner and/or outer layer can be made dependent upon the velocity of the tube so that the thickness of these layers can be made uniform. Concerted control of several operating parameters is known as "ramping".

The speed of tube is a very useful parameter for control of the apparatus, but not the only relevant one. Other important parameters are derived from the X-ray camera 34, which detects properties of the pipe as it is produced. An improved alternative to the X-ray camera is a laser detector, placed for example in the first cooling bath, to detect the outer radius of the pipe. The inner structure of the pipe, in particular the inner radius and the position of the metal layer within the pipe wall, can be determined using an ultrasonic detector, located for example in the second cooling bath. The ultrasonic detector operates in a conventional manner, utilizing reflections from the metal layer and the internal surface of the pipe of ultrasonic signals propagating through the fabric of the pipe. The measured thickness of the layers can be displayed on a VDU screen, or used as input data for an automatic control system capable of controlling any of the drive mechanism and first and second extruder apparatus so as to adjust the thickness of the inner and/or outer layers. The same information may also be encoded to produce signals to control peripheral components, such as those performing motorized tooling.

In preferred embodiments all the measured data is fed to an SPC (statistical process control) computer each millisecond and the encoded control signals are generated on the basis of a trend analysis updated each second. When the gauging devices detect a trend towards polymer depletion or overthickness, the computer causes corrective adjustment of the apparatus so as to maintain wall thickness.

A further function of the control system is to adjust the apparatus to compensate for variations in the running conditions or external environment. For example, it can perform closed loop electronic control of the pressure of the polymer passing through the extruders in dependence upon one or more pressure monitors (e.g. of the membrane type) in the extruders.

Embodiments of the invention will now be described in more detail with reference to the following Process Examples.

EXAMPLE 1

Using the tool layout as described in FIG. 3, a pipe is manufactured which has respective layers of plastics material, each being a crosslinked polyethylene. The pipe has a bore of 20 mm, an outer diameter of 24 mm and a wall thickness of 2 mm. The extruder temperature is within the range 200°–230° C. at an extrusion speed of 15 meters per minute. The spider 360 is disposed essentially adjacent the frusto-conical end part 316 of the extrusion die 304 as shown in FIG. 3 and its length is 7.2 mm. Three cooling baths are utilised, with a total length of 18 meters.

Before treatment of the metal foil with the tool layout as shown in FIG. 3, it is passed through the apparatus of FIG. 4 to subject it, while under appropriate tension, to treatment using a blend of fluorine and nitrogen in a proportion of 1.5 vol % $F_2$ with 98.5 vol % $N_2$ at a pressure of 0.5 bar, to provide a micron layer of fluorine on the foil, then to a cleaning operation by subjecting the foil to a blast from cold air jets and then to treatment with highly activated ions resulting from a corona discharge of 0.04 MeV on to the surface of the foil in an atmosphere of air at atmospheric pressure for a period of 30 seconds.

The advancing foil is first folded into a U-form configuration using the apparatus of FIG. 7 and then into an overlapped circular configuration using the apparatus of FIG. 6. Upon reaching the sonotrode shown in FIG. 3 the overlapped edges are joined at an amplitude of 7.5% and a power output of 1.5 kw. As the now sealed metal tube approaches a region coaxial with the annular exit orifice 322 of the first extrusion apparatus shown in FIG. 3 nitrogen gas as pressurising medium is applied at the gas conduit exit, forcing and cooling molten polymer extruding from orifice 322 against the inner surface of the metal tube to form an inner, bore layer of polymer. Simultaneously, molten polymer extruding from the exit orifice 346 of the second extrusion apparatus is applied to the outer surface of the metal tube to form an outer, sheath layer of polymer. The bore polymer layer has a thickness of 1 mm, the aluminium a thickness of 0.23 mm and the sheath polymer layer a thickness of 0.77 mm. As the pipe leaves the apparatus of FIG. 3, it enters into a first cooling bath at a temperature between 16° C. where it is compressed and sealed by crimper 28 so as to build up and maintain an internal pressure of 3 bar. Care should be taken to ensure that this pressure stabilised, any pressure loss of more than 5% being monitored, this indicating a leak occurring at either the compressed area of the pipe or at the welded joint, indicating a poor weld and faulty pipe. If the pressure loss lasts longer than 5 seconds, the sonotrode should be lifted from its weld position and the line shut down and reset. The pipe is then drawn by hauler tractor 36 through a second cooling bath 30 at a temperature of 14° C. and thence through a third cooling bath 32 at 10° C.

It is mentioned above that nitrogen gas is used as pressurising medium to force molten polymer against the inner surface of the metal tube. However, at the initial stages of setting up the extrusion system air at 3–5 bar should be used as pressurizing medium until the operational conditions are satisfied in relation to all aspects of the pipe and a stable extrusion is arrived at. After this has been achieved, the air can be replaced by nitrogen.

Figure 1:
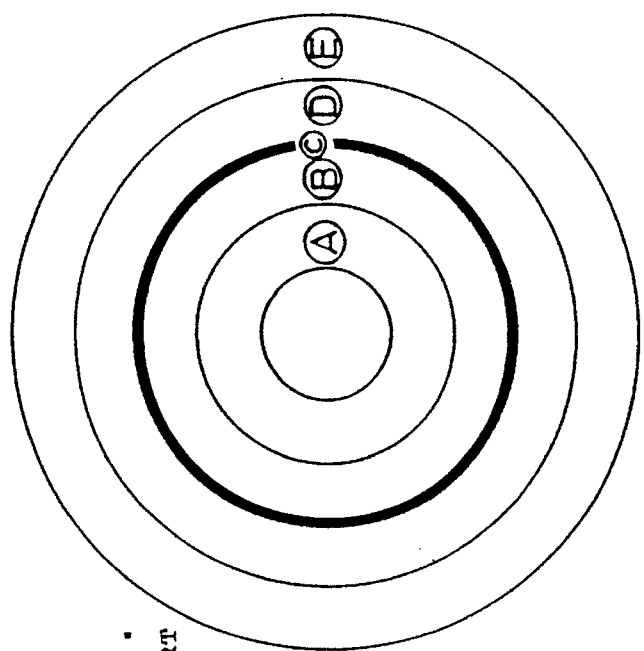
FIG. 1 is a cross-sectional view of a prior art pipe disclosed in U.S. Pat. No. 4,320,186 having layers B and D of adhesive material.

When using the equipment of FIG. 1, pressurizing gases which can be used in place of nitrogen include any other inert gas, air or steam, which has the effect, especially with silane crosslinkable polyethylene, of creating a more rapid gelation due to polymer crosslinking.

EXAMPLE 2

In this example, the metal foil is treated as in Example 1, except that the pressurizing medium is a blend of fluorine and nitrogen gas and the polymer is a high density polyethylene, in particular R/1001, with a weight of 949 kg/m$^3$. Since this polymer has a particularly stable molecular weight distribution a longer (14 mm) spider 360 (FIG. 3) can be employed, this allowing an extrusion speed of 25 m/min. However, protrusion of the axial end 342 of the gas supply conduit 338 needs to be extended. This extension can be optimised by taking 50% of the cubic meter weight of the polymer as millimeters to provide an extension of 474 mm. This extension prevents extruded polymer on the inner surface of the metal tube from becoming scorched and also enables stabilization of possible fluctuations in temperature at the exit orifice 322 of the first extrusion apparatus.

However, as an alternative, when using a shorter spider 360 or in the absence of a spider, the process can still be carried out efficiently, but at a slower extrusion rate of 16 B/min.

When conducting this process, care should be taken to ensure that no materials are used which are likely to oxidise such as exposed tool steel and thus diamond coatings and quartz should be present at all stages where contact with fluorine gas is likely.

Moreover, as in Example 1, until all operational conditions are as desired and have become stable, air should be used as the pressurizing gas, this being flushed out firstly with nitrogen as a precursor to introduction of the nitrogen/fluorine mixture.

In addition, if a leak were to occur within the water filled cooling bath when using the nitrogen/fluorine mixture, the reaction would be spontaneous generation of hydrofluoric acid, so besides the health risk, serious damage would occur to all metallic structures. Thus, the first of these baths should be filled either with a fluorinated mineral or an organic oil of zero water content. For this reason, the pipe crimping device is of the rodless cylinder type carrying a pneumatic "crab claw" pipe crimper which is capable of a submerging operation and so designed to travel without any induced bow wave. The first cooling bath operates at a temperature of 60° C. and under a vacuum of at least 1.5 Torr to remove atmospheric moisture and any toxicities should they have been generated. The second and third cooling baths operate at 14° C. and 10° C. respectively. The other process parameters are as in Example 1, but following the crimping of the pipe under nitrogen pressurization, the blended fluorine/nitrogen gases are pre-blended at $F_2$ 1.5%, $N_2$ 98.5%, vaporised and injected into the gas conduit at a precise pressure of 5 bar. If the pressure loss should become greater than 0.1% at the entry valve position, the line should be shut off.

Confirmation of imparted fluorination is possible by a visual check showing a dull white surface by comparison with a non-treated surface. Alternatively, the interfacial contact angle with distilled water can be measured; if treatment has taken place this should be equal to that of polytetrafluorethylene. Penetration of depth and degree of conversion are measured by means of an "XPS" scanning spectrophotometer.

Due to the vaporisation temperature of fluorine gas and its temperature control, it is possible to inject the blended gases at an optimum temperature of 5° C. and at a location within the pipe not only to obtain the best polymer conversion from $CH_4$ to $CF_2$ and minimum "burn off of the polymer", but also to achieve a degree and rate of cooling within the pipe which enables an extrusion speed as high as 25 meters per minute to be employed.

Thus, especially when using a gas which will modify the internal structure of the plastics material, the process provides a particularly efficient method of triple walled pipe production.

By eliminating the need for an adhesive material between plastics and metallic layers, the high thermal performance achievable using certain plastics materials can be realised. In particular, where a high density and/or crosslinked, polyethylene is employed, without adhesive, as at least an inner or outer wall of a laminate pipe including a metallic layer, the laminate pipe may be used at temperatures of up to 120° C. For other polymers, the pipe may be used at even higher temperatures.

In general, a laminate pipe construction embodying the invention, especially a laminate pipe having a metal foil layer and at least an inner or outer wall of high density polyethylene, has bendability and a service temperature range of from −40° C. to +95° C. without delamination of the polyethylene from the metal foil.

In view of the excellent adhesion achievable between the metal foil and a wide variety of plastics materials, the nature of the plastics material may be chosen as desired, in dependence upon the intended use. However, it is often preferred, in a triple walled pipe to provide an outer sheath layer of high density polyethylene with an inner bore layer of crosslinked polyethylene. If the bore layer is to be fluorinated with high pressure fluorine gas, this layer is preferably a high density (either crosslinked or non-crosslinked) polyethylene.

I claim:

1. An extrusion assembly for extrusion of a triple walled pipe, in which respective inner and outer layers of plastics material are bonded to, by face to face direct cohesive contact with, a metallic layer therebetween, which extrusion assembly comprises a first extrusion apparatus for extruding an inner layer of the pipe, which inner layer is of plastics material, which first extrusion apparatus comprises an extruder having an extrusion sleeve and an extrusion die disposed substantially coaxially within the extrusion sleeve, which extrusion sleeve and extrusion die together define, at an axial end of the extrusion sleeve, a first, annular, exit orifice for the plastics material which is to provide the inner layer of the pipe, a shaping sleeve for shaping a metallic layer, which shaping sleeve surrounds and is substantially coaxial with the extruder of the first extrusion apparatus and is disposed axially between opposed axial ends of the extruder, which shaping sleeve has a first axial end adapted to receive a U-section form metallic layer, a second axial end adapted to allow exit therefrom of the shaped metallic pipe and an elongate aperture disposed axially between the said axial ends and passing through a wall of the shaping sleeve to allow access through the wall of welding means the shaping sleeve being capable of shaping the U-section form metallic layer passing through it into a tubular configuration whereby opposed longitudinal edges of the metallic layer overlap with one another to provide a leaf seam in register with the said elongate aperture, welding means for welding the metallic layer of tubular configuration, which welding means is capable of passing through the elongate aperture in the wall of the shaping sleeve to weld the metallic layer at the said overlap and thereby provide a metal tube defining a metallic layer of the pipe, means for supplying a pressurized gas downstream of the first, annular exit orifice whereby extruded plastics material emerging from the said first exit orifice is forced against, so as to promote cohesive bonding thereof with, an internal surface of the metal tube to provide the inner layer of the pipe, and a second extrusion apparatus for extruding an outer layer of the pipe, which outer layer is of plastics material and is disposed radially outwardly of the metallic layer of the pipe, which second extrusion apparatus comprises a body part surrounding the said first, annular exit orifice for the plastics material which is to provide the inner layer of the pipe and a supply channel within the body part for supplying plastics material and terminating in a second exit orifice, downstream of the shaping sleeve and surrounding the metal tube, for the plastics material which is to provide the outer layer of the pipe, which extrusion assembly has positioning means selected from at least one of,
  (a) an essentially annular section recess in the body part of the second extrusion apparatus which recess is capable of receiving a second axial end of the shaping sleeve remote from the said first axial end, which allows accurate positioning of the shaping sleeve relative to the first and second extrusion apparatuses, and
  (b) a universal joint to which the extruder of the first extrusion apparatus is operatively connected, which connection is adjustable to adjust the position of the said first exit orifice of the first extrusion apparatus relative to the said second exit orifice of the second extrusion apparatus, thereby allowing accurate setting of the said position.

2. An extrusion assembly according to claim 1, which has at least positioning means (a).

3. An extrusion assembly according to claim 2, in which the annular section recess in the body part of the second extrusion apparatus receives the said second axial end of the shaping sleeve with a fit selected from an interference and a spring biased fit.

4. An extrusion assembly according to claim 1, in which the shaping sleeve is a single unit.

5. An extrusion assembly according to claim 4, in which the single unit shaping sleeve is formed in two parts held together but separable from one another along a substantially longitudinal plane passing through the sleeve so as to allow access into the sleeve.

6. An extrusion assembly according to claim 4, in which the shaping axial end of the shaping sleeve has a longitudinally extending stop, at an upper region of the internal periphery thereof, capable of receiving an abutting longitudinal edge portion of a metallic layer and thereby preventing further overlap of the longitudinal edge with the opposite longitudinal edge of the metallic layer or tendency for the leaf seam provided by the overlap to rotate from its central position resulting from the presence of the stop.

7. An extrusion assembly according to claim 1, in which the shaping sleeve has an internal surface coated with lithium doped quartz.

8. An extrusion assembly according to claim 7, in which the extrusion sleeve has an external surface coated with diamond.

9. An extrusion assembly according to claim 1, which has at least positioning means (b).

10. An extrusion assembly according to claim 9, in which the universal joint is a ball and socket arrangement in which the extruder of the first extrusion apparatus is connected to the ball and the ball includes a supply channel for supplying plastics material to the said extruder.

11. An extrusion assembly according to claim 1, in which the position of the extrusion die of the first extrusion apparatus is axially adjustable in relation to the extrusion sleeve.

12. An extrusion assembly according to claim 1, further comprising sensing means for sensing at least one parameter characterising the pipe extrusion process, and control means for adjusting the operation of the apparatus in response to the sensed parameters so as to enhance the longitudinal uniformity of the pipe.

13. An extrusion assembly according to claim 12, in which one sensed parameter is the speed at which the metallic layer passes through the shaping sleeve, and the control system is capable of correspondingly controlling the rate of operation of at least one of the welding means, the first extrusion apparatus and the second extrusion apparatus.

14. An extrusion assembly according to claim 12, in which one sensed parameter is the thickness of at least one of the inner and outer layers of the pipe, and the control system is capable of controlling the said thickness.

15. An extrusion assembly according to claim 1, further comprising a die supporting member disposed between the extrusion sleeve and the extrusion die towards the annular exit orifice, which die supporting member comprises a sleeve coaxial, and providing a press fit, with the die and having a plurality of fins which extend longitudinally between opposite axial ends of the sleeve and radially outwardly so as to terminate in an interference fit with the extrusion sleeve.

16. A method of bonding, by extrusion, a layer of plastics material to a layer of metal having low bonding affinity therefor, which method includes the steps of treating at least one surface of a metallic layer with a treatment gas, thereafter contacting the said surface of the metallic layer with high activity ions by passing the metallic layer through the high activity ions, thereby to promote cohesive bonding between the metallic layer and the layer of plastics material and extruding onto the surface of the metallic layer treated with the treatment gas and the high activity ions a layer of molten plastics material.

17. A method of chemically modifying an internal surface of a laminate pipe, which laminate pipe has an inner layer of plastics material and a metallic layer radially outwardly of the inner layer of plastics material, an inner surface of the metallic layer and an outer surface of the layer of plastics material being in a state of cohesive bonding with one another and an inner surface of the layer of plastics material providing the said internal surface of the pipe, which method comprises pressurising molten said plastics material against the internal surface of a metal tube which is to form the metallic layer of the laminate pipe, by means of pressure of a fluid, reactive with the molten plastics material, whereby, simultaneously, the said pressure of the fluid maintains the said state of adhesion between the inner surface of the metallic layer and the outer surface of the layer of molten plastics material and the said reactivity of the fluid allows chemical reaction between the molten plastics material and the fluid at the inner surface of the plastics material, thereby chemically modifying the internal surface of the laminated pipe.

18. A method according to claim 17, comprising the additional step of sealing respective opposite axial ends of the pipe to retain the fluid within the pipe, whereby the fluid thereafter continues to chemically modify the surface of the plastics material.

19. A method of producing a pipe having a metallic layer at least the internal surface of which is coated with a plastics material and which pipe contains hermetically sealed fluid material, which method includes the steps of extruding onto the internal surface of the metallic layer a layer of plastics material under the influence of a pressurized fluid medium acting within the pipe and thereafter sealing respective opposite axial ends of the pipe to retain the fluid material within the pipe whereby the said pressurized fluid within the pipe (a) maintains a pressure between the layer of plastics material and the metallic layer to promote cohesive bonding therebetween and, when the pressurized fluid is capable of reaction with the plastics material, (b) chemically modifies the internal surface of the pipe.

20. A method according to claim 19, in which the layer of plastics material is a polyolefin and the pressurized medium is fluorine gas, whereby the internal periphery of the pipe is provided by a fluoropolymer.

* * * * *